United States Patent
Ni et al.

(10) Patent No.: US 11,310,123 B2
(45) Date of Patent: Apr. 19, 2022

(54) METHOD FOR MANAGING SERVICE IN NETWORK FUNCTION VIRTUALIZATION ARCHITECTURE, AND APPARATUS

(71) Applicant: Huawei Technologies Co., Ltd., Shenzhen (CN)

(72) Inventors: Shaoji Ni, Helsinki (FI); Long Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/865,092

(22) Filed: May 1, 2020

(65) Prior Publication Data

US 2020/0259719 A1     Aug. 13, 2020

Related U.S. Application Data

(63) Continuation of application No. PCT/CN2018/113816, filed on Nov. 2, 2018.

(30) Foreign Application Priority Data

Nov. 3, 2017    (CN) ......................... 201711073113.4

(51) Int. Cl.
    *H04L 12/24*      (2006.01)
    *G06F 9/455*      (2018.01)
    (Continued)

(52) U.S. Cl.
    CPC .......... *H04L 41/50* (2013.01); *G06F 9/45558* (2013.01); *H04L 41/20* (2013.01);
    (Continued)

(58) Field of Classification Search
    CPC ......... H04L 41/50; H04L 41/20; H04L 41/24; H04L 47/82; H04L 45/563;
    (Continued)

(56) References Cited

U.S. PATENT DOCUMENTS

2016/0337329 A1* 11/2016 Sood ..................... H04L 63/205
2018/0181424 A1* 6/2018 Gokurakuji ......... H04L 41/5051
(Continued)

FOREIGN PATENT DOCUMENTS

| CN | 101252591 A | 8/2008 |
|---|---|---|
| CN | 105634782 A | 6/2016 |

(Continued)

OTHER PUBLICATIONS

Hawilo, "Orchestrating network function virtualization platform: Migration or reinstantiation?", 2017 IEEE 6th International Conference on Cloud Networking, Sep. 2017.*

(Continued)

*Primary Examiner* — Todd L Barker

(74) *Attorney, Agent, or Firm* — Leydig, Voit & Mayer, Ltd.

(57) ABSTRACT

This application provides a method for managing a service in an NFV architecture, and an apparatus. The method includes: generating, by a first network element after receiving a network function virtualization NFV resource change notification sent by a virtualized infrastructure manager VIM, first constraint information used to modify NFVI software and/or hardware; and sending, by the first network element, a first notification message to the VIM, where the first notification message carries the first constraint information, and the first constraint information is used by the VIM to modify NFVI software and/or hardware based on the first constraint information.

18 Claims, 16 Drawing Sheets

(51) Int. Cl.
*H04L 12/911* (2013.01)
*H04L 41/50* (2022.01)
*H04L 41/00* (2022.01)
*H04L 47/70* (2022.01)

(52) U.S. Cl.
CPC .............. *H04L 41/24* (2013.01); *H04L 47/82* (2013.01); *G06F 2009/4557* (2013.01); *G06F 2009/45595* (2013.01)

(58) Field of Classification Search
CPC ......... G06F 9/45558; G06F 2009/4557; G06F 2009/45595; G06F 9/5033; G06F 9/5055; G06F 9/5077; G06F 9/542
See application file for complete search history.

(56) References Cited

U.S. PATENT DOCUMENTS

| | | | |
|---|---|---|---|
| 2018/0260745 A1* | 9/2018 | Jana | G06F 11/3006 |
| 2020/0044919 A1* | 2/2020 | Yao | H04L 41/0806 |
| 2020/0174845 A1* | 6/2020 | Toeroe | G06F 9/542 |

FOREIGN PATENT DOCUMENTS

| | | |
|---|---|---|
| CN | 105955824 A | 9/2016 |
| CN | 107145378 A | 9/2017 |
| CN | 108011846 A | 5/2018 |
| WO | 2017144094 A1 | 8/2017 |

OTHER PUBLICATIONS

Crichingo, "A routing and placement scheme for network function virtualization", 2017 40th International Conference on Telecommunications and Signal Processing (TSP), Jul. 2017.*

Abu-Lebdeh , "On the Placement of VNF Managers in Large-scale and Distributed NFV Systems", Jul. 21, 2017.*

"PCR TR 32.842 Add procedure flow for VNF/VNFC notification due to scheduled NFVI maintenance," 3GPP TSG SA WG5 (Telecom Management) Meeting #102, Beijing, China, S5-154361 revision of S5-154139, Total 2 pages, 3rd Generation Partnership Project, Valbonne, France (Aug. 24-28, 2015).

"NFV IFA—3GPP SA5 Call #Jul. 3-9, 2015," 3GPP TSG SA WG5 (Telecom Management) Meeting #102, Beijing, China, S5-154049, pp. 1-7, 3rd Generation Partnership Project, Valbonne, France (Aug. 24-28, 2015).

"Adding functional requirement related to VNF application software update clause 5.4.4.3.1," 3GPP TSG SA WG5 (Telecom Management) Meeting #108, S5-164099, Harbin (China), XP051123001, total 2 pages, 3rd Generation Partnership Project, Valbonne, France (Jul. 11-15, 2016).

"3rd Generation Partnership Project; Technical Specification Group Services and System Aspects; Telecommunication management; Life Cycle Management (LCM) for mobile networks that include virtualized network functions; Requirements (Release 14)," 3GPP TS 28 525 V0.6.0, pp. 1-30, 3rd Generation Partnership Project, Valbonne, France (Jul. 2016).

* cited by examiner

METHOD FOR MANAGING SERVICE IN NETWORK FUNCTION VIRTUALIZATION ARCHITECTURE, AND APPARATUS

CROSS-REFERENCE TO RELATED APPLICATIONS

This application is a continuation of International Application No. PCT/CN2018/113816, filed on Nov. 2, 2018, which claims priority to Chinese Patent Application No. 201711073113.4, filed on Nov. 3, 2017, The disclosures of the aforementioned applications are hereby incorporated by reference in their entireties.

TECHNICAL FIELD

This application relates to the field of network function virtualization, and in particular, to a method for managing a service in a network function virtualization NFV architecture, and an apparatus.

BACKGROUND

To cope with future competition and challenges and avoid being channelized, operators accommodate current technology development trends such as virtualization and cloud computing and propose a new network function virtualization (NFV) standard architecture.

In the NFV, common hardware and virtualization technologies such as X86 are used, so that a function of a network device no longer relies on dedicated hardware. In this way, resources can be shared sufficiently and flexibly, new services are rapidly developed and deployed, and automatic deployment, flexible scale-out, fault isolation and self-healing, and the like are performed depending on an actual service requirement.

The European Telecommunications Standards Institute (ETSI) sets up an NFV Industry Specification Group (ISG) in October, 2012, to define network function virtualization requirements of the operators and related technical reports, so that some network functions are implemented on a common high performance server, a switch, and storage by using IT virtualization technologies. The NFV architecture and a basic procedure that are specified by the NFV Industry Specification Group have been used as standards in the industry, and are implemented in various telecommunications cloudification projects. A final objective of the NFV is to replace private and dedicated network element devices in a communications network with an X86 server, and a storage and switching device that are based on the industry standard. This requires that a network function should be implemented by software, run on common server hardware, and should be migrated, instantiated, and deployed at different locations of a network depending on requirements, without a need to install a new device. In the NFV, an IT device based on the X86 standard has low costs, so that huge investment costs can be reduced for the operators. In addition, an open API interface of the IT device can help the operators obtain more flexible network capabilities, to change network operations.

In the NFV architecture, a virtualized network function (VNF) is introduced, so that an architecture of a conventional network and a conventional network node greatly changes. In a new telecommunications architecture, the conventional network node is evolved into a virtual node, and is present in a form of a virtual machine, so that a plurality of conventional network nodes are deployed on a same physical host machine, share a hardware resource, and even share a resource with other third-party application software. In addition, for ease of dynamic migration of a virtual machine and enhancement of communication performance between virtual machines in a same virtualizer, a conventional IP network is evolved into a virtual network by using a virtual switch and a virtual network adapter, and virtual machines directly communicate with each other by using the virtual network, thereby bypassing a conventional physical network device. In the NFV, a function of the network device no longer relies on dedicated hardware through software and hardware decoupling and function abstraction, resources can be shared sufficiently and flexibly, new services are rapidly developed and deployed, and capabilities of an application such as automatic deployment, flexible scale-out, and fault isolation and self-healing are performed depending on an actual service requirement.

However, when an underlying physical network device resource changes (for example, needs to be upgraded, repaired, or maintained), some upper-layer services are affected. However, services in the telecommunications field usually have relatively high requirements for reliability. For example, an annual outage time of a service needs to be less than five minutes, or annual availability of a service needs to satisfy a requirement of 99.999%. Therefore, it is required that related software upgrade or resource modification in the NFV architecture should not interrupt a service.

Therefore, when an underlying physical resource changes, how to ensure normal running of a service becomes a problem to be resolved urgently.

SUMMARY

This application provides a method for managing a service in a network function virtualization architecture, and an apparatus, so as to ensure normal running of a service when an underlying physical resource changes.

According to a first aspect, a service management method is provided. The method is applied to a network function virtualization (NFV) architecture and includes: determining, by a first network element, an object affected by a change of a network function virtualization NFV resource, where the object affected by the change of the NFV resource is a virtualized network function (VNF) instance, a virtualized network function component VNFC instance, or a network service (NS) instance associated with the virtualized network function (VNF) instance, and the NFV resource includes at least one of the following resources: a virtual computing resource, a virtual storage resource, and a virtual network resource; and sending, by the first network element to a second network element, a first notification message used to indicate NFV resource maintenance, where the first notification message carries identification information of the object affected by the change of the NFV resource, so that the second network element manages a service in the object affected by the change of the NFV resource.

Specifically, when the NFV resource needs to change, a VIM sends, to the first network element, a notification message used to indicate that the NFV resource is to change. The notification message carries information about a virtual resource affected by the change of the NFV resource, and the information about the virtual resource may include an identifier of the virtual resource affected by the change of the NFV resource. After obtaining the virtual resource affected by the change of the NFV resource, the first network element determines, based on data stored in the first network element, the object corresponding to the affected virtual resource, namely, the object affected by the change of the NFV resource. Then, the first network element sends, to the second network element, the first notification message used to indicate NFV resource maintenance, so that the second network element manages the service in the object affected by the change of the NFV resource.

Therefore, in this embodiment of this application, when the NFV resource is to change, the first network element reports the first notification message to the second network element, and the second network element manages the service in the object affected by the change of the NFV resource, to avoid impact made by the change of the NFV resource on the service, and ensure normal running of the service.

Optionally, the first notification message may further carry a first resource change identifier, where the first resource change identifier is used to indicate a number of the to-be-changed NFV resource.

With reference to the first aspect, in some implementations of the first aspect, after obtaining the first notification message, the second network element may send a resource request message to the first network element, where the resource request message is used to request to create a virtual resource that is not affected by the change of the NFV resource. After obtaining the resource request message, the first network element may send a resource request to the VIM, to apply for the virtual resource that is not affected by the change of the NFV resource. After completing creation of the virtual resource that is not affected by the change of the NFV resource, the VIM sends a creation completion message to the first network element. Then, the first network element sends resource indication information to the second network element, where the resource indication information indicates the virtual resource that is not affected by the change of the NFV resource. Finally, the second network element migrates the service in the object affected by the change of the NFV resource to the virtual resource that is not affected by the change of the NFV resource.

Therefore, in this embodiment of this application, the service in the object affected by the change of the NFV resource is migrated to the virtual resource that is not affected by the change of the NFV resource, to avoid impact made by the change of the NFV resource on the service, ensure normal running of the service, and improve user experience.

With reference to the first aspect, in some implementations of the first aspect, before the sending, by the first network element to a second network element, a first notification message used to indicate a change of an NFV resource, the method further includes:

receiving, by the first network element, a first request message that is used to subscribe to an NFV resource maintenance notification and that is sent by the second network element, where the first request message is used to request the first network element to send the first notification message when the NFV resource is to change.

In other words, the second network element first sends, to the first network element, the first request message used to subscribe to an NFV resource change notification; and after obtaining the NFV resource change notification sent by the VIM, the first network element determines the object affected by the change of the network function virtualization NFV resource, and then sends the first notification message to the second network element.

With reference to the first aspect, in some implementations of the first aspect, the first request message carries identification information of a first object set, and the first object set includes at least one of the following objects: a virtualized network function VNF instance, a virtualized network function component VNFC instance, and a network service NS instance associated with the virtualized network function VNF instance; and the sending, by the first network element to a second network element, a first notification message used to indicate NFV resource maintenance includes: when the first network element determines that the object affected by the change of the NFV resource belongs to the first object set, sending, by the first network element to the second network element, the first notification message used to indicate NFV resource maintenance.

It should be understood that a quantity of objects in the first object set or a type of an object in the first object set is not limited in this embodiment of this application, and the first object set may include one or more of a VNF, an NS, or a VNFC. This embodiment of this application is not limited thereto. The first object set may be system-preset, or may be selected by the second network element from a plurality of objects based on importance of a service. For example, the first object set includes an object running a highly-reliable service. Optionally, the first object set may alternatively include all objects in the NFV architecture. In this case, the first network element may not need to perform determining, and the first network element needs to notify the second network element provided that an NFV resource is to change. This embodiment of this application is not limited thereto.

For example, the object in the first object set is an object running a highly-reliable service, and the service in the object is not allowed to be interrupted. To ensure normal running of the service in the first object set, the second network element may first register with the first network element by using the first request message, to subscribe to the NFV resource maintenance notification. The first request message carries an identifier of the first object set. In other words, the second network element requests the first network element to notify the second network element once a change of an NFV resource affects the object in the first object set, that is, the first network element needs to send the first notification message. Further, the second network element may perform corresponding service management, to ensure normal running of the service.

With reference to the first aspect, in some implementations of the first aspect, the first request message further carries an additional parameter, and the additional parameter includes at least one of the following parameters: event information indicating that the NFV resource is to change, an attribute of the to-be-changed NFV resource, and a time that needs to be reserved for processing due to the change of the NFV resource; and the attribute of the to-be-changed NFV resource indicates that the to-be-changed NFV resource is a virtual computing resource, a virtual storage resource, or a virtual network resource, and the event information indicating that the NFV resource is to change includes at least one piece of the following information: NFVI software upgrade, NFVI hardware repair, and NFVI hardware maintenance; and the first notification message further includes at least one type of parameter in the additional parameter to which the second network element subscribes and that is corresponding to the to-be-changed NFV resource.

Specifically, when the NFV resource needs to change, the VIM sends, to the first network element, the notification message used to indicate that the NFV resource is to change. The notification message carries the information about the virtual resource affected by the change of the NFV resource, and the information about the virtual resource may include the identifier of the virtual resource affected by the change of the NFV resource, the event information indicating that the NFV resource is to change, and the attribute of the to-be-changed NFV resource. After obtaining the information about the virtual resource affected by the change of the NFV resource, the first network element may determine, based on data stored in the first network element, the object corresponding to the affected virtual resource, namely, the object affected by the change of the NFV resource. Then, the first network element may determine whether the affected object belongs to the first object set. When the affected object belongs to the first object set, the first network element sends, to the second network element, the first notification message used to indicate NFV resource maintenance, where the first notification message may include information such as the identification information of the affected object, the event information indicating that the NFV resource is to change, and the attribute of the to-be-changed NFV resource, so that the second network element manages the service in the object affected by the change of the NFV resource.

Therefore, at least one type of parameter in the additional parameter is added to the first notification message, so that the second network element can determine, based on the parameter, that a type of the notification message is a resource change notification message, and can further distinguish the notification message from another notification message.

The foregoing describes a solution that when the NFV resource is to change, the second network element applies for the resource that is not affected by the change of the NFV resource, and migrates the service in the object affected by the change of the NFV resource to the virtual resource that is not affected by the change of the NFV resource. Alternatively, in this embodiment of this application, there may be no need to apply for the resource that is not affected by the change of the NFV resource. Instead, the second network element sends a policy indication used to modify NFVI software and/or hardware, to avoid impact made on the service.

With reference to the first aspect, in some implementations of the first aspect, after the sending, by the first network element to a second network element, a first notification message used to indicate a change of an NFV resource, the method further includes: sending, by the first network element to the virtualized infrastructure manager VIM, a second request message used to request to modify NFVI software and/or hardware, where the second request message carries first constraint information used to modify NFVI software and/or hardware.

With reference to the first aspect, in some implementations of the first aspect, the first notification message further carries a number of the to-be-changed NFV resource, and the first constraint information includes a second change identifier of an NFV resource;

the NFV resource includes at least one NFV resource group, the NFV resource group includes at least one basic NFV resource unit, the basic NFV resource unit is a basic unit for virtual computing, a basic unit for virtual storage, or a basic unit for virtual communication, the second change identifier of the NFV resource is corresponding to the number that is of the to-be-changed NFV resource and that is carried in the first notification message, and the NFV resource includes the to-be-changed NFV resource; and the first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

With reference to the first aspect, in some implementations of the first aspect, the NFV resource includes a virtual computing resource, and the basic unit for virtual computing is a virtual computing container; or the NFV resource includes a virtual storage resource, and the basic unit for virtual storage is a virtual storage container; or the NFV resource includes a virtual communication resource, and the basic unit for virtual communication is a virtual link VL.

With reference to the first aspect, in some implementations of the first aspect, before the sending, by the first network element to the VIM, a second request message used to modify NFVI software and/or hardware, the method further includes:

receiving, by the first network element, a policy indication message that is used to modify NFVI software and/or hardware and that is sent by the second network element, where the policy indication message carries second constraint information used to modify NFVI software and/or hardware, and the first constraint information is generated by the first network element by converting the second constraint information.

Therefore, in this embodiment of this application, the second network element sends, to the first network element, the policy indication message carrying the second constraint used to modify NFVI software and/or hardware. Further, the first network element determines, based on the second constraint information in the policy indication message, an object (for example, a VNF, a VNFC, or an NS) corresponding to the second constraint information, and determines the first constraint information based on a virtual resource corresponding to the object. Then, the first network element sends the first constraint information to the VIM by using the second request message, and further, the VIM modifies the NFV resource software or hardware based on the first constraint information, to avoid impact made on the service.

With reference to the first aspect, in some implementations of the first aspect, the first notification message further carries the number of the to-be-changed NFV resource; the second constraint information includes a first change identifier of an NFV resource and at least one of the following parameters: an identifier of an NS instance, an identifier of at least one VNF instance in the NS instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in the NFVI software and/or hardware modification process, a condition for constraining migration of a VNFC instance, an identifier of at least one group of virtual link (VL), an identifier of at least one virtual link (VL) in the at least one group of virtual link (VL), an affinity or anti-affinity rule between the at least one group of virtual link (VL), an affinity or anti-affinity rule between the virtual link (VL) in the at least one group of virtual link (VL), and a minimum quantity of virtual links (VLs) that need to be reserved in each of the at least one group of virtual link (VL) in the NFVI software and/or hardware modification process; and the first change identifier of the NFV resource is corresponding to the number that is of the to-be-changed NFV resource and that is carried in the first notification message, and the object affected by the change of the NFV resource belongs to the NS instance, the at least one VNF instance in the NS instance, or the at least one group of VNFC instance in the at least one VNF instance.

With reference to the first aspect, in some implementations of the first aspect, the first network element is an NFV orchestrator NFVO, and the second network element is an operations support system (OSS); or the first network element is a VNF manager VNFM, and the second network element is an element management system EM.

According to a second aspect, a service management method is provided. The method is applied to a network function virtualization NFV architecture and includes:

receiving, by a second network element, a first notification message that is used to indicate network function virtualization infrastructure NFV resource maintenance and that is sent by a first network element, where the first notification message carries identification information of an object affected by a change of an NFV resource, the object affected by the change of the NFV resource is a virtualized network function VNF instance, a virtualized network function component VNFC instance, or a network service NS instance associated with the virtualized network function VNF instance, and the NFV resource includes at least one of the following resources: a virtual computing resource, a virtual storage resource, and a virtual network resource; and managing, by the second network element, a service in the object affected by the change of the NFV resource.

Therefore, in this embodiment of this application, when the NFV resource is to change, the first network element reports the first notification message to the second network element, and the second network element manages the service in the object affected by the change of the NFV resource, to avoid impact made by the change of the NFV resource on the service, ensure normal running of the service, and improve user experience.

It should be understood that the service management method described in the second aspect from a perspective of the second network element is corresponding to the service management method described in the first aspect from a perspective of the first network element. Specifically, for features and effects in the second aspect, refer to the descriptions in the first aspect. To avoid repetition, details are not described herein again.

With reference to the second aspect, in some implementations of the second aspect, before the receiving, by a second network element, a first notification message that is used to indicate network function virtualization NFV resource maintenance and that is sent by a first network element, the method further includes: sending, by the second network element to the first network element, a first request message used to subscribe to an NFV resource maintenance notification, where the first request message is used to request the first network element to send the first notification message when the NFV resource is to change.

With reference to the second aspect, in some implementations of the second aspect, the first request message carries identification information of a first object set, and the first object set includes at least one of the following objects: a virtualized network function VNF instance, a virtualized network function component VNFC instance, and a network service NS instance associated with the virtualized network function VNF instance; and the object affected by the change of the NFV resource belongs to the first object set.

With reference to the second aspect, in some implementations of the second aspect, the first request message further carries an additional parameter, the additional parameter includes at least one of the following parameters: event information indicating that the NFV resource is to change, an attribute of the to-be-changed NFV resource, and a time that needs to be reserved for processing due to the change of the NFV resource, the attribute of the to-be-changed NFV resource indicates that the to-be-changed NFV resource is a virtual computing resource, a virtual storage resource, or a virtual network resource, the event information indicating that the NFV resource is to change includes at least one piece of the following information: NFVI software upgrade, NFVI hardware repair, and NFVI hardware maintenance, and the first notification message further includes at least one type of parameter in the additional parameter to which the second network element subscribes and that is corresponding to the to-be-changed NFV resource.

With reference to the second aspect, in some implementations of the second aspect, the managing, by the second network element, a service in the object affected by the change of the NFV resource includes: sending, by the second network element to the first network element, a policy indication message used to request to modify NFVI software and/or hardware, where the policy indication message carries second constraint information used to modify NFVI software and/or hardware, and the first constraint information is generated by the first network element by converting the second constraint.

With reference to the second aspect, in some implementations of the second aspect, the first notification message further carries a number of the to-be-changed NFV resource; the second constraint information includes a first change identifier of an NFV resource and at least one of the following parameters: an identifier of an NS instance, an identifier of at least one VNF instance in the NS instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in an NFVI software and/or hardware modification process, a condition for constraining migration of the VNFC, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, and a minimum quantity of virtual links VLs that need to be reserved in each of the at least one group of virtual link VL in the NFVI software and/or hardware modification process; and the first change identifier of the NFV resource is corresponding to the number that is of the to-be-changed NFV resource and that is carried in the first notification message, and the object affected by the change of the NFV resource belongs to the NS instance, the at least one VNF instance in the NS instance, or the at least one group of VNFC instance in the at least one VNF instance.

With reference to the second aspect, in some implementations of the second aspect, the first network element is an NFV orchestrator NFVO, and the second network element is an operations support system OSS; or the first network element is a VNF manager VNFM, and the second network element is an element management system EM.

According to a third aspect, a service management method is provided. The method is applied to a network function virtualization NFV architecture and includes: generating, by a first network element after receiving a network function virtualization NFV resource change notification sent by a virtualized infrastructure manager VIM, first constraint information used to modify NFVI software and/or hardware; and sending, by the first network element, a first notification message to the VIM, where the first notification message carries the first constraint information, and the first constraint information is used by the VIM to modify NFVI software and/or hardware based on the first constraint information.

Specifically, when an NFV resource needs to change, the first network element receives a notification message indicating that the NFV resource is to change. For example, when the NFV resource needs to change, the VIM sends the resource change notification message, where the notification message indicates that the NFV resource needs to change. Then, the first network element may generate the first constraint information used to modify NFVI software and/or hardware, and send the first constraint information to the VIM by using the first notification message; and further, the VIM may modify the NFVI software and/or hardware based on the first constraint information.

Therefore, in this embodiment of this application, when an NFV resource is to change, the first network element sends, to the VIM, the constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

With reference to the third aspect, in some implementations of the third aspect, before the sending, by the first network element, a first notification message to the VIM, the method further includes: receiving, by the first network element, a first subscription request message sent by the VIM, where the first subscription request message is used to subscribe to constraint information used to modify NFVI software and/or hardware; and sending, by the first network element, a reply message to the VIM, where the reply message is used to indicate that the VIM successfully subscribes to the constraint information.

Specifically, the VIM first sends the subscription request message to the first network element, to register and subscribe to the constraint information used to modify NFVI software and/or hardware. After obtaining and receiving the notification message indicating that the NFV resource is to change, the first network element generates, based on the subscription of the VIM, the first constraint information used to modify NFVI software and/or hardware, and sends the first constraint information to the VIM by using the first notification message; and further, the VIM may modify the NFVI software and/or hardware based on the first constraint information.

It should be understood that in the foregoing description of this embodiment of this application, information is first subscribed to by using the subscription request message, and then the first network element sends the first notification message only after obtaining the NFV resource change notification. This manner can satisfy a stipulation in an existing standard, that is, a requirement that a notification is sent after subscription can satisfy a procedure in the existing standard. Optionally, in this embodiment of this application, the VIM may not send the subscription request message, and the first network element may send the first notification message to the VIM after obtaining the NFV resource change notification. Although this manner does not satisfy the standard procedure, in this case, signaling overheads between network elements can be reduced and system performance can be improved. This embodiment of this application is not limited thereto.

With reference to the third aspect, in some implementations of the third aspect, the first constraint information includes a change identifier of an NFV resource; the NFV resource includes at least one NFV resource group, the NFV resource group includes at least one basic NFV resource unit, the basic NFV resource unit is a basic unit for virtual computing, a basic unit for virtual storage, or a basic unit for virtual communication, the change identifier of the NFV resource is corresponding to a number that is of a to-be-changed NFV resource and that is carried in the NFV resource change notification sent by the VIM, and the NFV resource includes the to-be-changed NFV resource; and the first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

With reference to the third aspect, in some implementations of the third aspect, the NFV resource includes a virtual computing resource, and the basic NFV resource unit is a virtual computing container; or the NFV resource includes a virtual storage resource, and the basic NFV resource unit is a virtual storage container; or the NFV resource includes a virtual communication resource, and the basic NFV resource unit is a virtual link VL.

With reference to the third aspect, in some implementations of the third aspect, the generating, by a first network element after receiving a network function virtualization infrastructure NFV resource change notification sent by a virtualized infrastructure manager VIM, first constraint information used to modify NFVI software and/or hardware includes: after receiving the NFV resource change notification sent by the VIM, querying, by the first network element, for real-time running status data of a virtualized network function VNF, and generating second constraint information based on a virtualized network function descriptor VNFD; and converting, by the first network element, the second constraint information into the first constraint information.

With reference to the third aspect, in some implementations of the third aspect, the second constraint information includes at least one of the following parameters: an identifier of at least one VNF instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in an NFV resource software or hardware modification process, an identifier of at least one group of virtual link (VL), an identifier of at least one virtual link (VL) in the at least one group of virtual link (VL), an affinity or anti-affinity rule between the at least one group of virtual link (VL), an affinity or anti-affinity rule between the virtual link (VL) in the at least one group of virtual link (VL), a minimum quantity of virtual links (VLs) that need to be reserved in each of the at least one group of virtual link (VL) in the NFV resource software or hardware modification process, and a condition for constraining migration of the VNFC;

the generating second constraint information based on a virtualized network function descriptor (VNFD) includes:

generating, by the first network element, the second constraint information by using a VNF life cycle management script carried in the VNFD; and the converting, by the first network element, the second constraint information into the first constraint information includes:

converting, by the first network element, the second constraint into the first constraint information based on a correspondence between a VNF instance and an NFV resource.

For example, the first network element obtains, from a VNF software package, an applet that can generate the second constraint information, where the applet can generate, by querying a database of the VNF instance, an NFVI software and/or hardware modification policy (namely, the second constraint information). The first network element generates the second constraint information by using the applet, and then converts the second constraint information into the first constraint information.

For example, a VNF software vendor makes the applet, and adds the applet to the VNF software package for publishing. The applet can implement the following function: calculating and obtaining the NFVI software and/or hardware modification policy (corresponding to the second constraint information) by querying for real-time running status data of a VNF. When delivering a VNF instantiation request to the first network element, the second network element adds the VNF life cycle management script (script) or a VNF monitoring indicator to the VNFD specified by the request message. When receiving an event indicating that the NFV resource is to change due to software or hardware or daily maintenance, the first network element triggers execution of the VNF life cycle management script (script), and the VNF life cycle management script (script) triggers the VNFM to execute the applet for the policy or constraint used to modify NFVI software and/or hardware, to generate the second constraint information through calculation, and convert the second constraint information into the first constraint information.

With reference to the third aspect, in some implementations of the third aspect, the first network element is an NFV orchestrator NFVO, and the NFV resource change notification is received by the NFVO directly by using the VIM; or the first network element is a VNF manager VNFM, and the NFV resource change notification is received by the VNFM directly by using the VIM, or the NFV resource change notification is received by the VNFM indirectly by using an NFVO.

According to a fourth aspect, a service management method is provided. The method is applied to a network function virtualization NFV architecture and includes: receiving, by a virtualized infrastructure manager VIM, a first notification message sent by a first network element, where the first notification message carries first constraint information used to modify network function virtualization infrastructure NFVI software and/or hardware; and modifying, by the VIM, NFVI software and/or hardware based on the first constraint information.

Therefore, in this embodiment of this application, when an NFV resource is to change, the first network element sends, to the VIM, the constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

It should be understood that the service management method described in the fourth aspect from a perspective of the VIM is corresponding to the service management method described in the third aspect from a perspective of the first network element. Specifically, for features and effects in the fourth aspect from the perspective of the VIM, refer to the descriptions in the first aspect. To avoid repetition, details are not described herein again.

With reference to the fourth aspect, in some implementations of the fourth aspect, before the receiving, by a VIM, a first notification message sent by a first network element, the method further includes: sending, by the VIM, a first subscription request message to the first network element, where the first subscription request message is used to subscribe to constraint information used to modify NFVI software and/or hardware; and receiving, by the VIM, a reply message sent by the first network element, where the reply message is used to indicate that the VIM successfully subscribes to the constraint information.

With reference to the fourth aspect, in some implementations of the fourth aspect, the first constraint information includes a change identifier of an NFV resource;

the NFV resource includes at least one NFV resource group, the NFV resource group includes at least one basic NFV resource unit, the basic NFV resource unit is a basic unit for virtual computing, a basic unit for virtual storage, or a basic unit for virtual communication, the change identifier is corresponding to a number carried in the NFV resource change notification sent by the VIM, and the NFV resource includes a to-be-changed NFV resource; and the first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

With reference to the fourth aspect, in some implementations of the fourth aspect, the NFV resource includes a virtual computing resource, and correspondingly the basic unit for virtual computing is a virtual computing container; or the NFV resource includes a virtual storage resource, and correspondingly the basic unit for virtual storage is a virtual storage container; or the NFV resource includes a virtual communication resource, and correspondingly the basic unit for virtual communication is a virtual link VL.

With reference to the fourth aspect, in some implementations of the fourth aspect, the modifying, by the VIM, NFVI software and/or hardware based on the first constraint information includes: performing, by the VIM, an operation of terminating a to-be-changed.

NFV resource (in this application, "changed" specifically means "to be changed"), and modifying NFVI software and/or hardware corresponding to the terminated NFV resource. For an action of terminating, by the VIM, the to-be-changed NFV resource, refer to a procedure in an existing standard, for example, refer to 7.3.1.5, 7.4.1.5, and 7.5.1.5 in ETSI GS NFV-IFA 005 V2.1.1 (2016-04) that respectively describe termination of a virtual computing resource, a virtual network resource, and a virtual storage resource. Termination herein may be understood as release of a binding relationship between the NFV resource and a user, and the terminated NFV resource cannot provide a service. The "modifying NFVI software and/or hardware corresponding to the terminated NFV resource" may be upgrade, deletion, adding, and the like of the software and/or hardware. For example, when the NFV resource is a virtual storage resource, corresponding NFVI software may be virtualization software, and modifying software may be upgrading the virtualization software. Corresponding NFVI hardware may be a hard disk or a flash memory, and modifying hardware may be modification such as adding a hard disk or a flash memory.

In another implementation, the performing, by the VIM, an operation of terminating a to-be-changed NFV resource includes: S1: terminating one or more basic NFV resource units in the to-be-changed NFV resource, where a quantity of remaining basic NFV resource units after the one or more basic NFV resource units in the to-be-changed NFV resource are terminated cannot be less than a predetermined minimum quantity; S2: removing the terminated NFV resource from a resource pool managed by the VIM, that is, removing an internal management object (internal management objects) corresponding to the terminated NFV resource. For a specific method for performing the "termination" action, refer to descriptions in the standard.

In another implementation, after learning that a service associated with the terminated to-be-changed NFV resource has been restored to a new NFV resource, the VIM performs the actions in S1 and S2, and modifies the NFVI software and/or hardware corresponding to the terminated NFV resource. The process is repeated, so that all to-be-changed NFV resources are terminated, modification of NFVI software and/or hardware corresponding to the terminated NFV resources is completed, and services associated with the terminated to-be-changed NFV resources are restored to new NFV resources.

For example, it is assumed that a user uses 10 basic NFV resource units respectively numbered 1, 2, 3, 4, . . . , and 10, and there are four to-be-changed basic NFV resource units respectively numbered 1, 2, 3, and 4. It is assumed that a predetermined minimum quantity is 8. In this case, step S1 may be first performed to terminate one or two basic NFV resource units (because a quantity of remaining basic NFV resource units after termination cannot be less than 8), for example, terminate two basic NFV resource units in this embodiment. Then, a removal operation in S2 is performed (to be specific, the two basic NFV resource units are removed from the resource pool managed by the VIM). Next, NFVI software and/or hardware corresponding to the terminated NFV resource are/is modified, so that the modified NFVI software and/or hardware can be used as a new NFV resource subsequently.

In addition, after the termination action in S1 and the removal action in S2 are performed, an EM may apply to the VIM for a new NFV resource by using a VNFM, and allocate the new NFV resource to a VNF; and the VNF restores, to the applied-for NFV resource, a part or all of a service associated with the terminated NFV resource (in other words, the service on the terminated NFV resource is restored to the applied-for new NFV resource). In this embodiment, two new NFV resources respectively numbered 11 and 12 may be applied for (certainly, more or fewer NFV resources may alternatively be applied for), and then, a part or all of services associated with the NFV resources numbered 1 and 2 may be restored to the NFV resources numbered 11 and 12.

In this application, the VIM monitors a running status of the VNF, and performs the termination operation in S1 and the removal operation in S2 after learning that the VNF restores the service. Specifically, because there are four to-be-changed basic NFV resource units, two basic NFV resource units need to be terminated subsequently. In this case, the foregoing process may be repeated. For example, basic NFV resource units numbered 3 and 4 are terminated and removed. Then, services associated with the basic NFV resource units numbered 3 and 4 are restored to a new NFV resource (namely, a basic NFV resource unit, for example, the services are restored to a new basic NFV resource unit numbered 13), and then NFVI software and/or hardware corresponding to the terminated NFV resources are/is modified.

Termination performed in this way can avoid, to a greatest extent, impact made on a service. To be specific, in a process of upgrading a basic NFV resource unit, some basic NFV resource units can still provide service support (for example, basic NFV resource units numbered 1 and 2 are terminated first, and basic NFV resource units numbered 3 to 10 can still provide service support).

With reference to the fourth aspect, in some implementations of the fourth aspect, the first network element is an NFV orchestrator NFVO, or the first network element is a VNF manager VNFM.

According to a fifth aspect, a first network element is provided. The first network element includes modules or units configured to perform the method in the first aspect or any possible implementation of the first aspect.

According to a sixth aspect, a second network element is provided. The second network element includes modules or units configured to perform the method in the second aspect or any possible implementation of the second aspect.

According to a seventh aspect, a first network element is provided. The first network element includes modules or units configured to perform the method in the third aspect or any possible implementation of the first aspect.

According to an eighth aspect, a VIM is provided. The VIM includes modules or units configured to perform the method in the fourth aspect or any possible implementation of the fourth aspect.

According to a ninth aspect, a first network element is provided, including a transceiver, a processor, and a memory. The processor is configured to control the transceiver to receive and transmit signals, the memory is configured to store a computer program, and the processor is configured to invoke the computer program from the memory and run the computer program, so that the first network element performs the method in the first aspect and the possible implementations of the first aspect.

According to a tenth aspect, a second network element is provided, including a transceiver, a processor, and a memory. The processor is configured to control the transceiver to receive and transmit signals, the memory is configured to store a computer program, and the processor is configured to invoke the computer program from the memory and run the computer program, so that the second network element performs the method in the second aspect and the possible implementations of the second aspect.

According to an eleventh aspect, a first network element is provided, including a transceiver, a processor, and a memory. The processor is configured to control the transceiver to receive and transmit signals, the memory is configured to store a computer program, and the processor is configured to invoke the computer program from the memory and run the computer program, so that the first network element performs the method in the third aspect and the possible implementations of the third aspect.

According to a twelfth aspect, a VIM is provided, including a transceiver, a processor, and a memory. The processor is configured to control the transceiver to receive and transmit signals, the memory is configured to store a computer program, and the processor is configured to invoke the computer program from the memory and run the computer program, so that the VIM performs the method in the fourth aspect and the possible implementations of the fourth aspect.

In a possible design, a solution implemented by the first network element may be implemented by a chip.

In a possible design, a solution implemented by the second network element may be implemented by a chip.

In a possible design, a solution implemented by the VIM may be implemented by a chip.

According to a thirteenth aspect, a computer program product is provided. The computer program product includes a computer program (also referred to as code or an instruction), and when the computer program runs, a computer is enabled to perform the methods in the first aspect to the fourth aspect and any possible implementation of the first aspect to the fourth aspect.

According to a fourteenth aspect, a computer-readable medium is provided. The computer-readable medium stores a computer program (also referred to as code or an instruction), and when the computer program runs on a computer, the computer is enabled to perform the methods in the first aspect to the fourth aspect and any possible implementation of the first aspect to the fourth aspect.

DESCRIPTION OF EMBODIMENTS

The following describes technical solutions of this application with reference to accompanying drawings.

Figure 1:
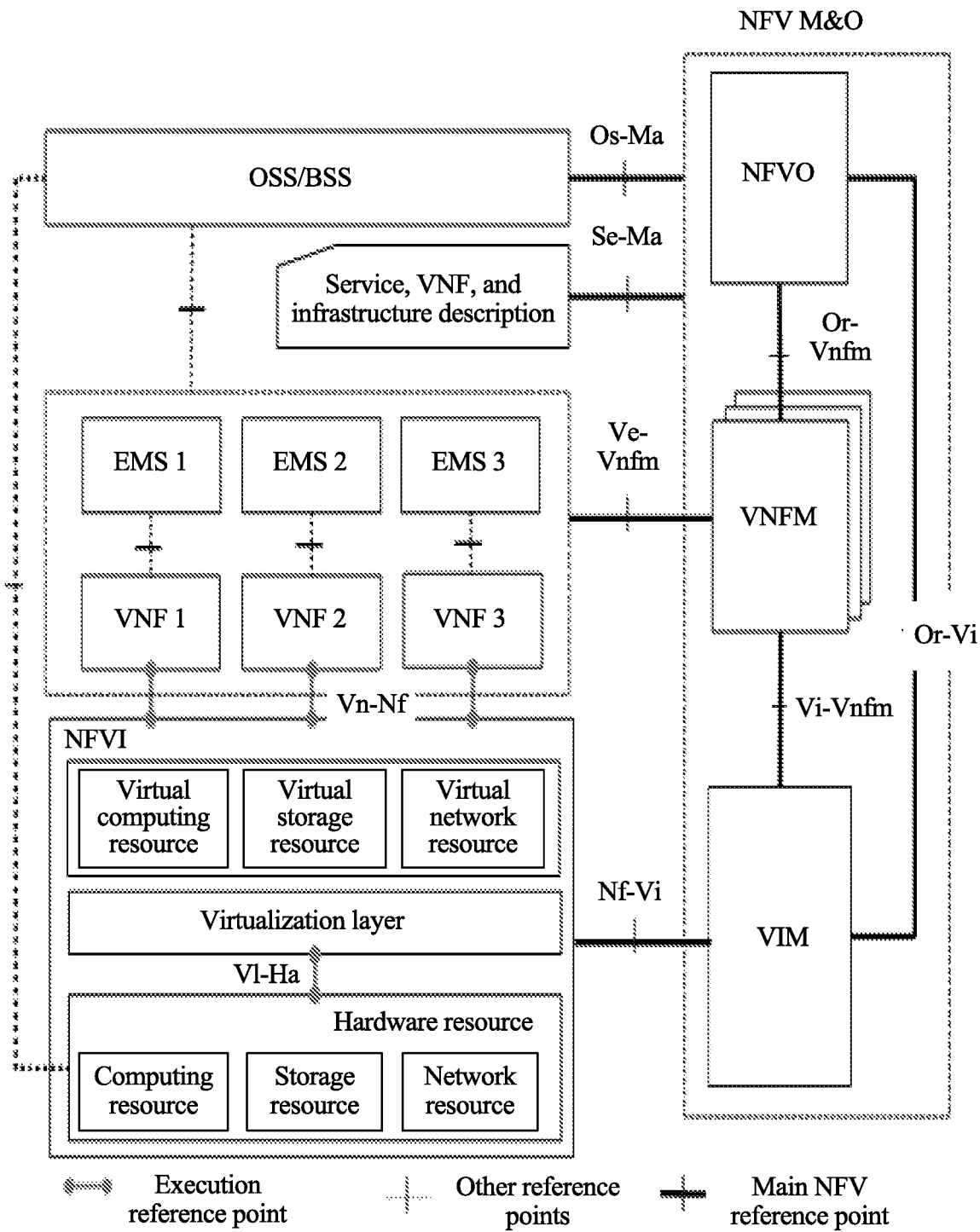
FIG. 1 is a schematic architectural diagram of an NFV system according to an embodiment of this application.

FIG. 1 is a schematic architectural diagram of an NFV system according to an embodiment of the present invention. As shown in FIG. 1, a reference NFV architecture includes several main function components as follows.

An NFV infrastructure (NFVI) provides virtualized resources needed for supporting execution of NFV, including commercial off the shelf (COTS) hardware, a necessary accelerator component, and a software layer for virtualizing and abstracting underlying hardware.

For example, the NFVI may include a hardware resource layer incorporating computing hardware, storage hardware, and network hardware, a virtualization layer, and a virtual resource layer incorporating virtual computing (for example, a virtual machine), virtual storage, and a virtual network.

A virtualized network function (VNF) can be implemented on network function (NF) software that runs on the NFVI, and an element management system (EMS or EM) may be attached to understand and manage a separate VNF and a characteristic thereof. The VNF is equivalent to a network node entity, and is expected to be delivered as software only, independent of hardware.

NFV management and orchestration (M&O or MANO) includes orchestration, life cycle management of a physical and/or software resource supporting infrastructure virtualization, and life cycle management of the VNF. The NFV M&O focuses on a virtualization-specific management task in the NFV architecture. The NFV M&O also interacts with an operations support system (OSS)/business support system (BSS) (outside the NFV), so that the NFV can be integrated into an existing network-wide management scenario.

The foregoing components interact with each other by using a defined reference point, so that different entities can be clearly decoupled, to form an open and innovative NFV ecosystem. A reference point between the VNF and the NFVI (and a reference point between entities inside the NFVI) processes resource abstraction and virtualization, and in-host running of the VNF; therefore, the VNF can be migrated from one entity to another in the NFVI, and it is possible to select different underlying hardware. A reference point between the NFV M&O and the VNF and a reference point between the NFV M&O and the NFVI (and a reference point between entities inside the NFV M&O) process management and operation of the NFV system. A design manner of a related component allows reuse of an existing solution (for example, a cloud management system), and the related component interacts with an existing OSS/BSS environment to which the NFV system needs to be connected.

The following function components are further defined in the NFV M&O:

An NFV orchestrator (NFVO) is mainly responsible for life cycle management of an NS to complete a network service orchestration function, and NFV resource orchestration in a plurality of VIMs to complete a resource orchestration function.

A VNF manager (VNFM) is responsible for life cycle management of a VNF instance. It is assumed that each VNF has one associated VNFM, and one VNFM may be designated to manage a single VNF instance or manage a plurality of same or different VNF instances. An available capability of the VNFM includes VNF instantiation, configuring an NFV resource for the VNF, VNF instance update, VNF instance scale-out, NFVI performance measurement and event collection related to a VNF instance, VNF instance—related event association, VNF instance assistance or self-healing, VNF instance termination, integrity management of a VNF instance throughout a life cycle of the VNF instance, playing a global coordination and adaption role in configuration and event reporting between the NFVI and the EMS, and the like.

A virtualized infrastructure manager (VIM) is responsible for control and management of computing, storage, and network resources of the NFVI, and is usually deployed within an infrastructure subdomain of an operator. One VIM may specially process a particular type of NFV resource or may manage a plurality of types of NFV resources. An available capability of the VIM includes orchestrating allocation/upgrade/deallocation/recycling of an NFV resource, managing association between a virtualized resource and computing, storage, and network resources, managing directories of hardware resources (computing, storage, and a network) and a software resource (for example, a management program), collecting and forwarding performance measurement and an event of a virtualized resource, and the like.

In the system architecture shown in FIG. 1, when an underlying NFV resource is to change, some upper-layer (for example, a VNF) services are affected.

In a solution, when an underlying NFV resource is to change, the VIM directly performs live migration on a virtual machine VM. However, in this manner, because live migration of the VM is directly performed without considering an upper-layer service, the service is affected and even interrupted, and user experience is affected.

In this embodiment of this application, when the NFV resource is to change, a first network element (for example, an NFVO or a VNFM) reports a resource change notification message to a second network element (for example, an OSS or an EM), and the second network element may perform service migration after obtaining the notification message, so that a service is not interrupted, impact made by a change of the NFV resource on the service is avoided, and user experience can be improved.

The following describes in detail a service management method in the embodiments of this application with reference to specific embodiments.

It should be understood that in the embodiments of this application, a term "network element" represents a function component in the NFV architecture. For example, the network element may be an NFVO, an OSS, a VNF, a VNFM, or an EM. The "network element" may also be referred to as a "function component", a "device", an "apparatus", or the like. This embodiment of this application is not limited thereto.

Figure 2:
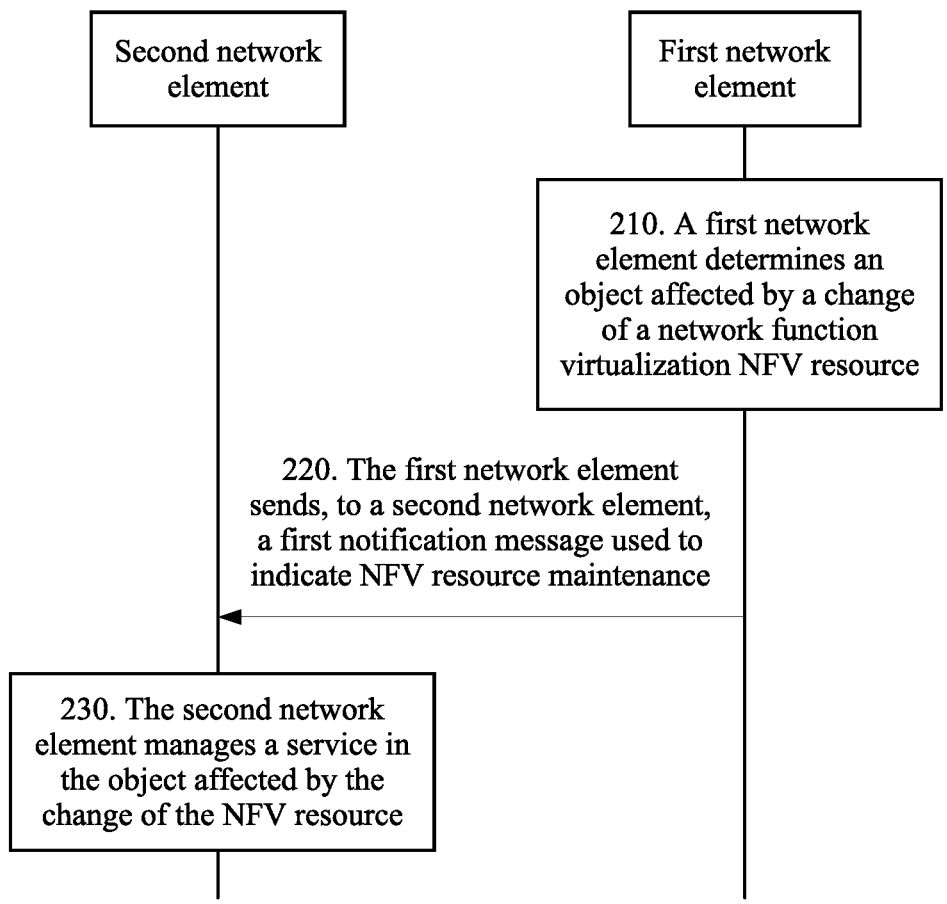
FIG. 2 is a flowchart of a service management method according to an embodiment of this application.

FIG. 2 is a schematic flowchart of a service management method according to an embodiment of the present invention. The method in FIG. 2 may be applicable to an NFV system 100 shown in FIG. 1, and a method 200 shown in FIG. 2 includes the following steps.

210. A first network element determines an object affected by a change of a network function virtualization NFV resource.

Specifically, the object affected by the change of the NFV resource is a virtualized network function VNF instance, a virtualized network function component VNFC instance, or a network service NS instance associated with the virtualized network function VNF instance. The NFV resource includes at least one of the following resources: a virtual computing resource, a virtual storage resource, and a virtual network resource.

220. The first network element sends, to a second network element, a first notification message used to indicate NFV resource maintenance, where the first notification message carries identification information of the object affected by the change of the NFV resource, so that the second network element manages a service in the object affected by the change of the NFV resource.

230. The second network element manages the service in the object affected by the change of the NFV resource.

Specifically, when the NFV resource needs to change, a VIM sends, to the first network element, a notification message used to indicate that the NFV resource is to change. The notification message carries information about a virtual resource affected by the change of the NFV resource, and the information about the virtual resource may include an identifier of the virtual resource affected by the change of the NFV resource. After obtaining the virtual resource affected by the change of the NFV resource, the first network element determines, based on data stored in the first network element, the object corresponding to the affected virtual resource, namely, the object affected by the change of the NFV resource. Then, the first network element sends, to the second network element, the first notification message used to indicate NFV resource maintenance, so that the second network element manages the service in the object affected by the change of the NFV resource.

Therefore, in this embodiment of this application, when the NFV resource is to change, the first network element reports the first notification message to the second network element, and the second network element manages the service in the object affected by the change of the NFV resource, to avoid impact made by the change of the NFV resource on the service, ensure normal running of the service, and improve user experience.

Optionally, in another embodiment, the first network element is an NFV orchestrator NFVO, and the second network element is an operations support system OSS; or the first network element is a VNF manager VNFM, and the second network element is an element management system EM.

Optionally, the first notification message may further carry a number of the to-be-changed NFV resource.

In this embodiment of this application, a currently to-be-changed NFV resource may be numbered (or a current NFVI is identified) by using the number of the to-be-changed NF resource, so that when network elements send messages to each other, the number of the to-be-changed resource may be added or an identifier corresponding to the number of the to-be-changed resource may be added, and a network element receiving a message distinguishes the to-be-changed resource from another to-be-changed NFV resource based on the number of the to-be-changed resource.

Optionally, in another embodiment, in step 230, after obtaining the first notification message, the second network element may send a resource request message to the first network element, where the resource request message is used to request to create a virtual resource that is not affected by the change of the NFV resource. After obtaining the resource request message, the first network element may send a resource request to the VIM, to apply for the virtual resource that is not affected by the change of the NFV resource. After completing creation of the virtual resource that is not affected by the change of the NFV resource, the VIM sends a creation completion message to the first network element. Then, the first network element sends resource indication information to the second network element, where the resource indication information indicates the virtual resource that is not affected by the change of the NFV resource. Finally, the second network element migrates the service in the object affected by the change of the NFV resource to the virtual resource that is not affected by the change of the NFV resource.

Therefore, in this embodiment of this application, the service in the object affected by the change of the NFV resource is migrated to the virtual resource that is not affected by the change of the NFV resource, to avoid impact made by the change of the NFV resource on the service, ensure normal running of the service, and improve user experience.

Optionally, in another embodiment, before step 210, the method 200 may further include:

sending, by the second network element to the first network element, a first request message used to subscribe to an NFV resource change notification, where the first request message is used to request the first network element to send the first notification message when the NFV resource is to change.

In other words, the second network element first sends, to the first network element, the first request message used to subscribe to the NFV resource change notification; and after obtaining the NFV resource change notification sent by the VIM, the first network element determines the object affected by the change of the network function virtualization NFV resource, and then sends the first notification message to the second network element.

Optionally, in another embodiment, the first request message carries identification information of a first object set, and the first object set includes at least one of the following objects: a virtualized network function VNF instance, a virtualized network function component VNFC instance, and a network service NS instance associated with the virtualized network function VNF instance.

In step 220, when the first network element determines that the object affected by the change of the NFV resource belongs to the first object set, the first network element sends, to the second network element, the first notification message used to indicate NFV resource maintenance.

It should be understood that a quantity of objects in the first object set or a type of an object in the first object set is not limited in this embodiment of this application, and the first object set may include one or more of a VNF, an NS, or a VNFC. This embodiment of this application is not limited thereto. The first object set may be system-preset, or may be selected by the second network element from a plurality of objects based on importance of a service. For example, the first object set includes an object running a highly-reliable service. Optionally, the first object set may alternatively include all objects in an NFV architecture. In this case, the first network element may not need to perform determining, and the first network element needs to notify the second network element provided that an NFV resource is to change. This embodiment of this application is not limited thereto.

For example, the object in the first object set is an object running a highly-reliable service, and the service in the object is not allowed to be interrupted. To ensure normal running of the service in the first object set, the second network element may first register with the first network element by using the first request message, to subscribe to an NFV resource maintenance notification. The first request message carries an identifier of the first object set. In other words, the second network element requests the first network element to notify the second network element once a change of an NFV resource affects the object in the first object set, that is, the first network element needs to send the first notification message. Further, the second network element may perform corresponding service management, to ensure normal running of the service.

Optionally, in an embodiment, the first request message may further carry an additional parameter, and the additional parameter includes at least one of the following parameters: event information indicating that the NFV resource is to change, an attribute of the to-be-changed NFV resource, and a time that needs to be reserved for processing due to the change of the NFV resource. The attribute of the to-be-changed NFV resource indicates that the to-be-changed NFV resource is a virtual computing resource, a virtual storage resource, or a virtual network resource, and the event information indicating that the NFV resource is to change includes at least one piece of the following information: NFVI software upgrade, NFVI hardware repair, and NFVI hardware maintenance. The first notification message may further include at least one type of parameter in the additional parameter to which the second network element subscribes and that is corresponding to the to-be-changed NFV resource.

Therefore, at least one type of parameter in the additional parameter is added to the first notification message, so that the second network element can determine, based on the parameter, that a type of the notification message is a resource change notification message, and can further distinguish the notification message from another notification message.

Optionally, in another embodiment, the additional parameter and the identification information of the first object set are carried in a filter in the first request message.

Specifically, the first request message carries the filter, and the filter carries the identification information of the first object set. Optionally, the filter may further carry the additional parameter. It should be understood that in this embodiment of this application, adding information to the filter may represent that corresponding information is packaged for sending. This embodiment of this application is not limited thereto.

Specifically, when the NFV resource needs to change, the VIM sends, to the first network element, the notification message used to indicate that the NFV resource is to change. The notification message carries the information about the virtual resource affected by the change of the NFV resource, and the information about the virtual resource may include the identifier of the virtual resource affected by the change of the NFV resource, the event information indicating that the NFV resource is to change, and the attribute of the to-be-changed NFV resource. After obtaining the information about the virtual resource affected by the change of the NFV resource, the first network element may determine, based on the data stored in the first network element, the object corresponding to the affected virtual resource, namely, the object affected by the change of the NFV resource. Then, the first network element may determine whether the affected object belongs to the first object set. When the affected object belongs to the first object set, the first network element sends, to the second network element, the first notification message used to indicate NFV resource maintenance, where the first notification message may include information such as the identification information of the affected object, the event information indicating that the NFV resource is to change, and the attribute of the to-be-changed NFV resource, so that the second network element manages the service in the object affected by the change of the NFV resource.

The foregoing describes a solution that when the NFV resource is to change, the second network element applies for the resource that is not affected by the change of the NFV resource, and migrates the service in the object affected by the change of the NFV resource to the virtual resource that is not affected by the change of the NFV resource. Alternatively, in this embodiment of this application, there may be no need to apply for the resource that is not affected by the change of the NFV resource. Instead, the second network element sends a policy indication used to modify NFVI software and/or hardware, to avoid impact made on the service.

Specifically, in another embodiment, in step 230, after the second network element receives the first notification message that is used to indicate NFV resource maintenance and that is sent by the first network element, the second network element sends, to the first network element, a policy indication message used to request to modify NFVI software and/or hardware, where the policy indication message carries second constraint information used to modify NFVI software and/or hardware. Further, the first network element determines, based on the second constraint information in the policy indication message, an object (for example, a VNF, a VNFC, or an NS) corresponding to the second constraint information, and determines first constraint information based on a virtual resource corresponding to the object. Then, the first network element sends, to the VIM, a second request message used to request to modify NFVI software and/or hardware, where the second request message carries the first constraint information used to modify NFVI software and/or hardware. The VIM modifies NFV resource software or hardware based on the first constraint information.

Optionally, in an embodiment, the first notification message further carries the number of the to-be-changed NFV resource, and the second constraint information includes a first change identifier of an NFV resource and at least one of the following parameters: an identifier of an NS instance, an identifier of at least one VNF instance in the NS instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in an NFVI software and/or hardware modification process, a condition for constraining migration of the VNFC, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, and a minimum quantity of virtual links VLs that need to be reserved in each of the at least one group of virtual link VL in the NFVI software and/or hardware modification process.

The first change identifier of the NFV resource is corresponding to the number that is of the to-be-changed NFV resource and that is carried in the first notification message, and the object affected by the change of the NFV resource belongs to the NS instance, the at least one VNF instance in the NS instance, or the at least one group of VNFC instance in the at least one VNF instance. Optionally, the second constraint information may be carried in a filter in the second request message, or the second constraint information may be directly carried in the second request message. This embodiment of this application is not limited thereto.

Optionally, the first constraint information includes a second change identifier of an NFV resource; the NFV resource includes at least one NFV resource group, the NFV resource group includes at least one basic NFV resource unit, the basic NFV resource unit is a basic unit for virtual computing, a basic unit for virtual storage, or a basic unit for virtual communication, the second change identifier of the NFV resource is corresponding to the number that is of the to-be-changed NFV resource and that is carried in the first notification message, and the NFV resource includes the to-be-changed NFV resource; and the first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in the NFVI software and/or hardware modification process, and a condition for constraining migration of a basic NFV resource unit. Optionally, the first constraint information may be carried in the filter in the second request message, or the first constraint information may be directly carried in the second request message. This embodiment of this application is not limited thereto.

Optionally, in another embodiment, the NFV resource includes a virtual computing resource, and the basic unit for virtual computing is a virtual computing container; or the NFV resource includes a virtual storage resource, and the basic unit for virtual storage is a virtual storage container; or the NFV resource includes a virtual communication resource, and the basic unit for virtual communication is a virtual link VL.

Therefore, in this embodiment of this application, the second network element sends, to the first network element, the policy indication message carrying the constraint used to modify NFVI software and/or hardware. Further, the first network element determines, based on the second constraint information in the policy indication message, the object (for example, a VNF, a VNFC, or an NS) corresponding to the second constraint information, and determines the first constraint information based on the virtual resource corresponding to the object. Then, the first network element sends the first constraint information to the VIM by using the second request message, and further, the VIM modifies the NFV resource software or hardware based on the first constraint information, to avoid impact made on the service.

The foregoing describes, with reference to FIG. 2, two service management solutions for avoiding service interruption when an NFV resource is to change in the embodiments of this application. A first solution is a service migration solution, and a second solution is an NFVI software and/or hardware modification solution.

The following describes in detail the service management method in the embodiments of this application in different cases with reference to specific examples in FIG. 3A to FIG. 6B. The first solution is described with reference to FIG. 3A and FIG. 3B and by using an example in which a first network element is a VNFM and a second network element is an EM. The first solution is described with reference to FIG. 4A and FIG. 4B and by using an example in which a first network element is an NFVO and a second network element is an OSS. The second solution is described with reference to FIG. 5A and FIG. 5B and by using an example in which a first network element is a VNFM and a second network element is an EM. The second solution is described with reference to FIG. 6A and FIG. 6B and by using an example in which a first network element is an NFVO and a second network element is an OSS.

In the embodiments of this application, in FIG. 3A, FIG. 3B, FIG. 4A, and FIG. 4B, a service management plane (an OSS or an EM) registers with an NFVO or a VNFM to subscribe to a notification mechanism indicating that an NFV resource used by a VNF is to change due to NFVI software upgrade, VIM software upgrade, or the like, so that the VNF can perform service migration. In this way, a highly-reliable service is not interrupted when the NFVI changes, and normal running of the service is ensured.

In the embodiments of this application, in FIG. 5A, FIG. 5B, FIG. 6A, and FIG. 6B, a service management plane (an OSS or an EM) registers with an NFVO or a VNFM to subscribe to a notification mechanism indicating that an NFV resource used by a VNF is to change due to NFVI software upgrade, VIM software upgrade, so that the EM or the OSS can provide a constraint in software or hardware request signaling. In this way, a highly-reliable service is not interrupted when the NFVI changes, and normal running of the service is ensured.

Figure 3A:
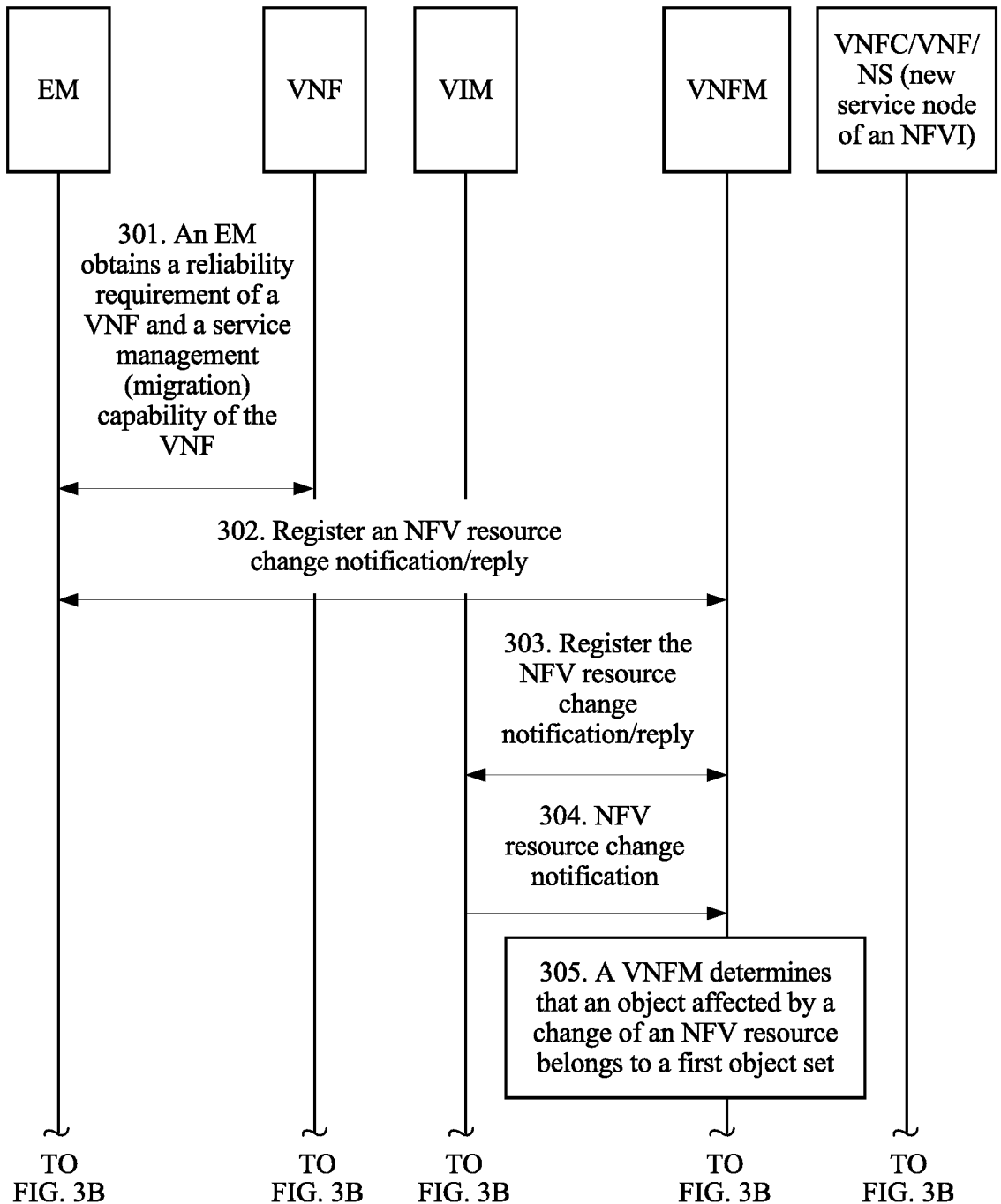
FIG. 3A and FIG. 3B are a flowchart of a service management method according to another embodiment of this application.
Figure 3B:
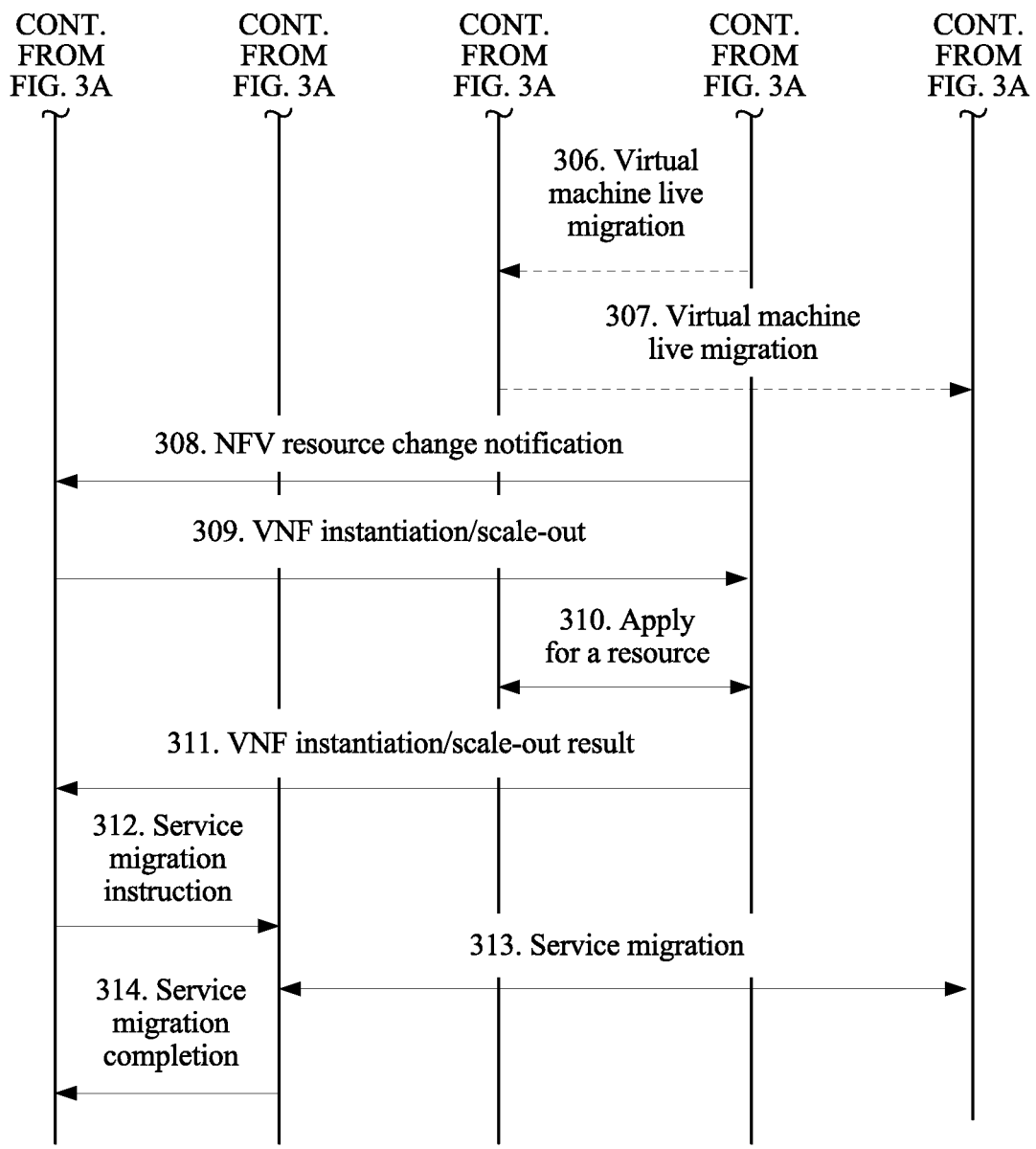

Specifically, in a method shown in FIG. 3A and FIG. 3B, the service migration solution is described by using an example in which a first network element is a VNFM and a second network element is an EM. Specifically, the method shown in FIG. 3A and FIG. 3B includes the following steps.

301. The EM obtains a reliability requirement of a VNF and a service management (migration) capability of the VNF.

For example, the EM obtains a VNF corresponding to a highly-reliable service, and learns that the VNF has a service management (migration) capability.

302. The EM registers an NFV resource change notification, and the VNFM replies to the registration.

Specifically, the EM sends, to the VNFM, a first request message used to subscribe to the NFV resource change notification. In other words, the EM registers (or subscribes to) the NFV resource change notification. Correspondingly, the VNFM replies to the EM with a response message. The first request message carries identification information of the first object set, and the first request message is used to request the VNFM to send the first notification message when a change of an NFV resource affects an object in the first object set.

The first object set may be the VNF running the highly-reliable service.

303. The VNFM registers the NFV resource change notification, and a VIM replies to the registration.

Specifically, the VNFM sends, to the VIM, a request message used to subscribe to the NFV resource change notification, to request the VIM to send the NFV resource change notification when an NFV resource is to change. Correspondingly, the VIM replies to the VNFM with a response message.

304. The VIM sends the NFV resource change notification to the VNFM.

Specifically, when an NFV resource is to change (for example, NFVI software upgrade, NFVI hardware repair, and NFVI hardware maintenance), the VIM sends, to the VNFM, a notification message used to indicate that the NFV resource is to change. The notification message carries an identifier of a virtual resource affected by the change of the NFV resource, and the NFV resource includes at least one of the following resources: a virtual computing resource, a virtual storage resource, and a virtual network resource.

305. The VNFM determines that an object affected by a change of an NFV resource belongs to a first object set.

Specifically, after obtaining the NFV resource change notification, the VNFM determines an object on the affected virtual resource, that is, determines the object affected by the change of the NFV resource. The affected object may be a VNF instance, a VNFC instance, or an NS instance. This embodiment of this application is not limited thereto. Then, the VNFM determines whether the affected object belongs to the first object set. When the affected object belongs to the first object set, the VNFM instructs the EM to perform service migration, and performs step 308.

Specifically, when the affected object belongs to the first object set, it indicates that reliability of a service in the object is relatively high, and service interruption needs to be avoided. Therefore, service migration needs to be performed to avoid service interruption.

When it is determined that the affected object does not belong to the first object set, it indicates that a highly-reliable service corresponding to the first object set is not affected, or an affected service has a tolerance to some extent, for example, short interruption is allowed. Therefore, virtual machine migration may be directly performed. In this case, step 306 may be performed to perform live migration on a virtual machine.

306. The VNFM sends a virtual machine live migration instruction to the VIM.

307. The VIM performs live migration on a virtual machine.

Specifically, the VIM migrates an affected virtual machine to a new virtual machine that is not affected by the change of the NFV resource.

308. The VNFM sends the NFV resource change notification to the EM.

For example, the VNFM sends the first notification message used to indicate NFV resource maintenance, where the first notification message carries identification information of the object affected by the change of the NFV resource.

309. The EM instructs the VNFM to perform VNF instantiation/scale-out.

Specifically, the EM instructs the VNFM to create new VNF instantiation or perform VNF scale-out. For example, the EM sends a resource request message to the VNFM, where the resource request message is used to request to create a virtual resource that is not affected by the change of the NFV resource.

310. The VNFM applies to the VIM for a resource.

Specifically, after obtaining the resource request message, the VNFM sends a resource request to the VIM, to apply for the virtual resource that is not affected by the change of the NFV resource. After obtaining the resource request, the VIM creates the virtual resource that is not affected by the change of the NFV resource. After completing creation of the virtual resource that is not affected by the change of the NFV resource, the VIM sends a creation completion message to the first network element.

311. The VNFM reports a VNF instantiation/scale-out result.

Specifically, the VNFM sends resource indication information to the EM, where the resource indication information indicates the virtual resource that is not affected by the change of the NFV resource.

312. The EM sends a service migration instruction to the VNF.

313. The VNF performs service migration.

Specifically, the VNF migrates a service to a new service node.

314. The VNFM reports, to the EM, that service migration is completed.

After the VNF completes service migration, the VNFM sends a service migration completion notification message to the EM. Then, the EM may request the VNFM to release a resource of earlier-version software, so that the VIM can perform software upgrade, resource modification, hardware maintenance, or the like.

Therefore, in this embodiment of this application, the service management plane EM registers with the VNFM to subscribe to a notification mechanism indicating that an NFV resource used by the VNF is to change due to NFVI software upgrade, VIM software upgrade, or the like, so that the VNF can perform service migration. In this way, a highly-reliable service is not interrupted when the NFVI changes, and normal running of the service is ensured.

It should be understood that FIG. 3A and FIG. 3B are merely an example of the embodiments of this application. Optionally, signaling messages in steps such as step 308 may further include a first resource change identifier, where the first resource change identifier may be used to indicate a number of the to-be-changed NFV resource.

Figure 4A:
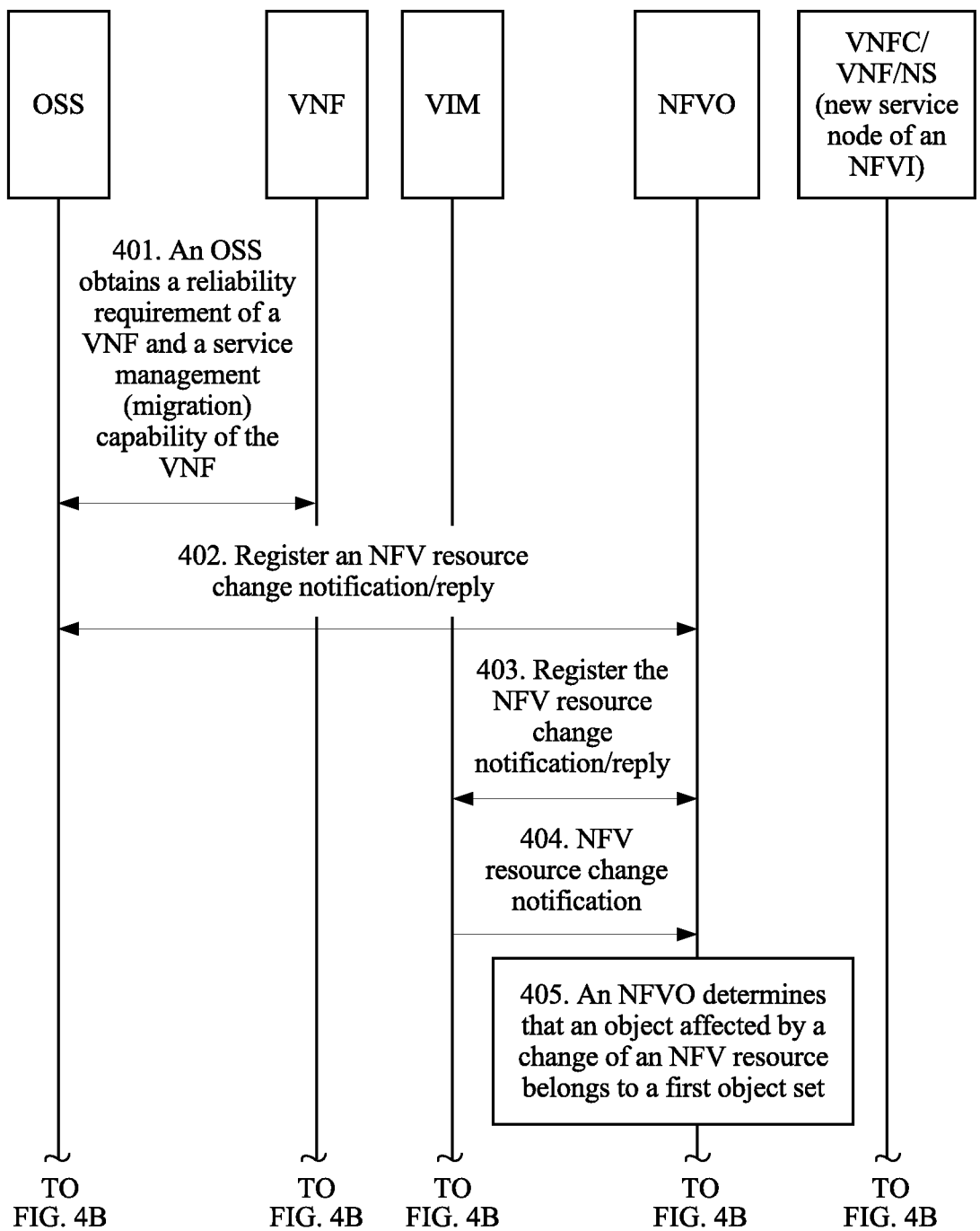
FIG. 4A and FIG. 4B are a flowchart of a service management method according to another embodiment of this application.
Figure 4B:
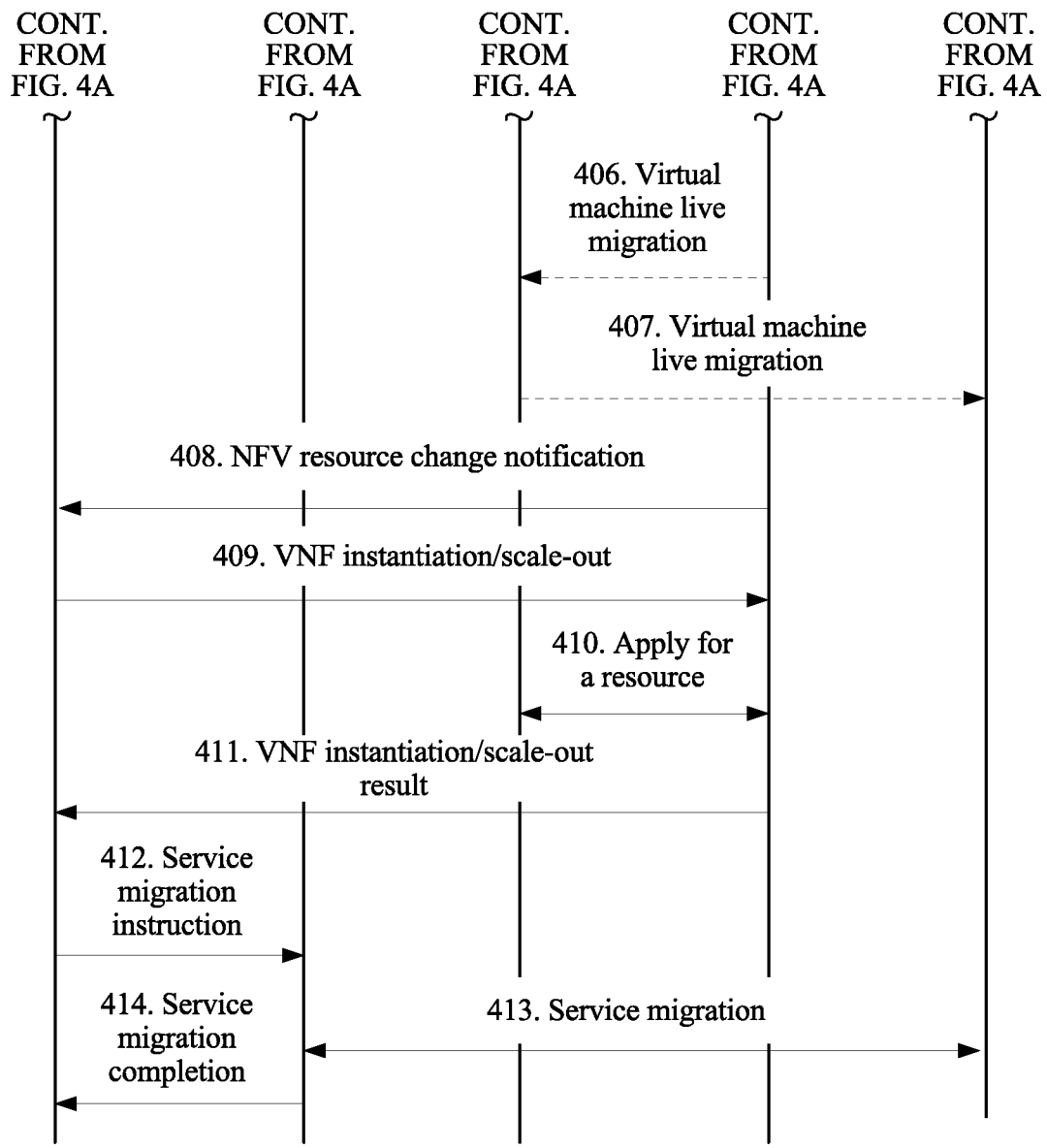

In a method shown in FIG. 4A and FIG. 4B, the service migration solution is described by using an example in which a first network element is an NFVO and a second network element is an OSS. Specifically, the method shown in FIG. 4A and FIG. 4B includes the following steps 401 to 414. It should be understood that the method shown in FIG. 4A and FIG. 4B is similar to that in FIG. 3A and FIG. 3B. Steps 401 to 414 are respectively corresponding to steps 301 to 314, and a difference lies in that the EM in FIG. 3A and FIG. 3B is replaced with the OSS and the VNFM in FIG. 3A and FIG. 3B is replaced with the NFVO to obtain the method in FIG. 4A and FIG. 4B. To avoid repetition, detailed descriptions are appropriately omitted in the steps in FIG. 4A and FIG. 4B. It should be understood that because the OSS cannot directly communicate with a VNF, a message or data transmitted between the OSS and the VNF in FIG. 4A and FIG. 4B needs to be forwarded by an EM. Specifically, after obtaining a message sent by the OSS (or the VNF), the EM may directly forward the message to the VNF (or the OSS), or the EM may forward a corresponding message after processing the message. This embodiment of this application is not limited thereto.

401. The OSS obtains a reliability requirement of a VNF and a service management (migration) capability of the VNF.

402. The OSS registers an NFV resource change notification, and the NFVO replies to the registration.

403. The NFVO registers the NFV resource change notification, and a VIM replies to the registration.

404. The VIM sends the NFV resource change notification to the NFVO.

405. The NFVO determines that an object affected by a change of an NFV resource belongs to a first object set.

The NFVO determines whether the affected object belongs to the first object set. When the affected object belongs to the first object set, the NFVO instructs the OSS to perform service migration, and performs step 408.

When it is determined that the affected object does not belong to the first object set, step 406 is performed to perform live migration on a virtual machine.

406. The NFVO sends a virtual machine live migration instruction to the VIM.

407. The VIM performs live migration on a virtual machine.

408. The NFVO sends the NFV resource change notification to the OSS.

409. The OSS instructs the NFVO to perform VNF instantiation/scale-out.

410. The NFVO applies to the VIM for a resource.

411. The NFVO reports a VNF instantiation/scale-out result.

412. The OSS sends a service migration instruction to the VNF.

413. The VNF performs service migration.

414. The NFVO reports, to the OSS, that service migration is completed.

After the VNF completes service migration, the NFVO sends a service migration completion notification message to the OSS. Then, the OSS may request the NFVO to release a resource of earlier-version software, so that the VIM can perform software upgrade, resource modification, hardware maintenance, or the like.

Therefore, in this embodiment of this application, the service management plane OSS registers with the NFVO to subscribe to a notification mechanism indicating that an NFV resource used by the VNF is to change due to NFVI software upgrade, VIM software upgrade, or the like, so that the VNF can perform service migration. In this way, a highly-reliable service is not interrupted when the NFVI changes, and normal running of the service is ensured.

It should be understood that for content and usage of the messages in FIG. 3A, FIG. 3B, FIG. 4A, and FIG. 4B, refer to the foregoing corresponding descriptions in FIG. 2. To avoid repetition, details are not described herein again.

It should also be understood that the examples in FIG. 3A, FIG. 3B, FIG. 4A, and FIG. 4B are merely used to help a person skilled in the art understand the embodiments of the present invention, but are not intended to limit the embodiments of the present invention to a specific value or a specific scenario in the examples. A person skilled in the art apparently can make various equivalent modifications or changes according to the examples shown in FIG. 3A, FIG. 3B, FIG. 4A, and FIG. 4B, and such modifications or changes also fall within the scope of the embodiments of the present invention.

For example, in step 302 in FIG. 3A, an action of registering, by the EM, the NFV resource change may be performed by the VNF instead, and correspondingly step 301 may be removed. In step 308, an action of reporting, by the VNFM, the NFV resource change notification to the VNF may be replaced with an action of reporting, by the VNFM, the NFV resource change notification to the VNF. This embodiment of this application is not limited thereto.

Figure 5A:
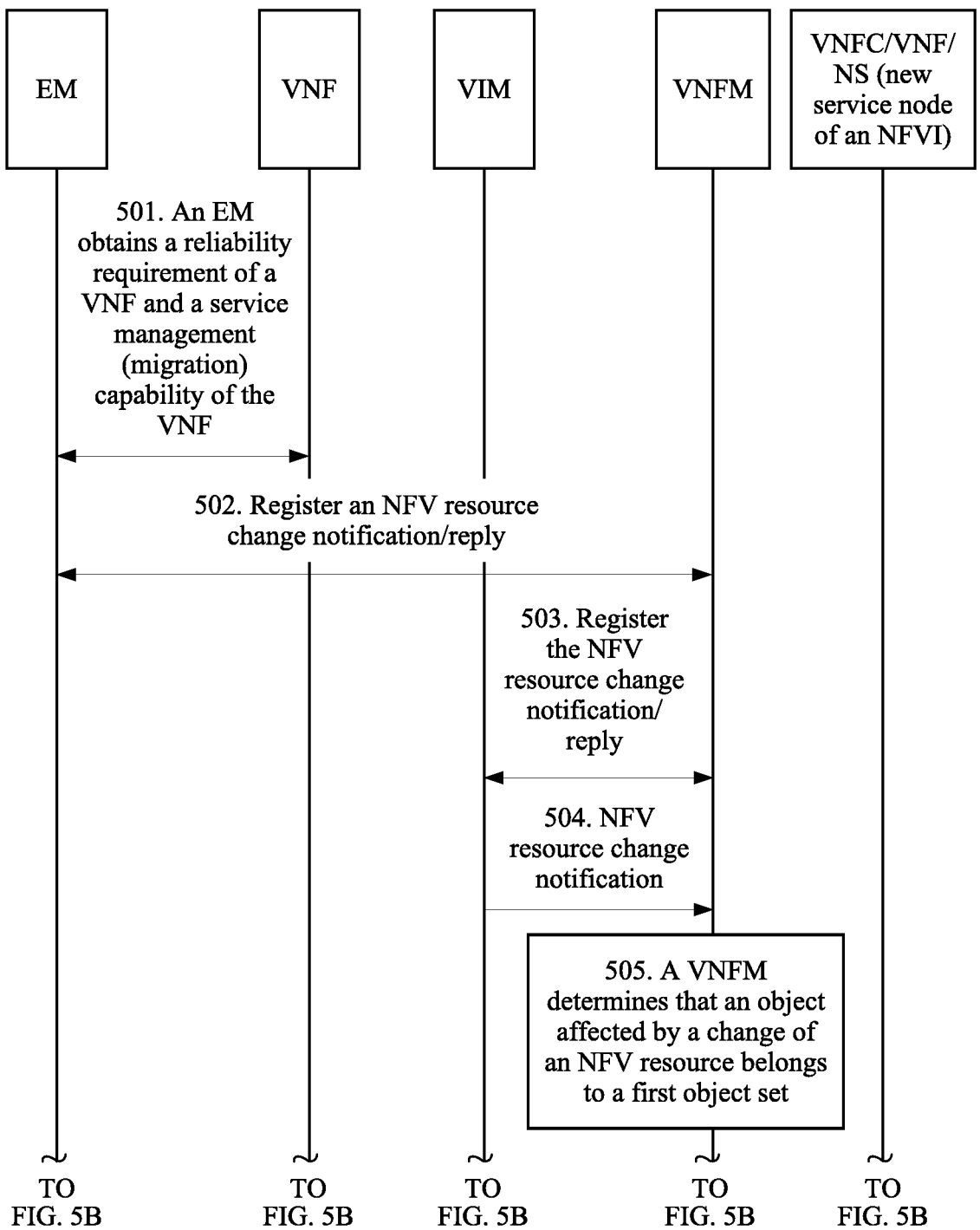
FIG. 5A and FIG. 5B are a flowchart of a service management method according to another embodiment of this application.
Figure 5B:
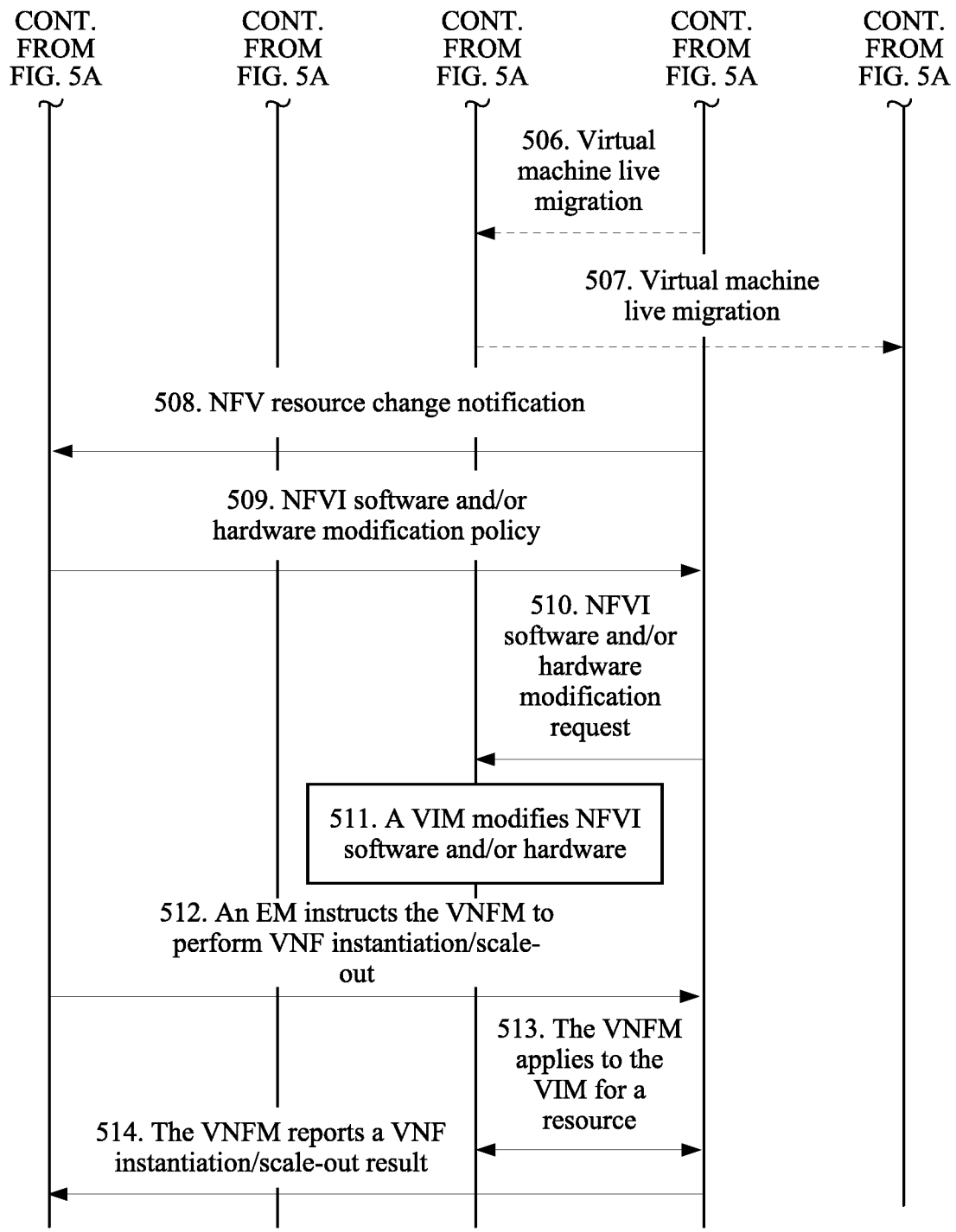

In a method shown in FIG. 5A and FIG. 5B, the NFVI software and/or hardware modification solution is described by using an example in which a first network element is a VNFM and a second network element is an EM. Specifically, the method shown in FIG. 5A and FIG. 5B includes the following steps.

501. The EM obtains a reliability requirement of a VNF and a service management (migration) capability of the VNF.

For example, the EM obtains a VNF corresponding to a highly-reliable service, and learns that the VNF does not have a service management (migration) capability.

502. The EM registers an NFV resource change notification, and the VNFM replies to the registration.

Specifically, the EM sends, to the VNFM, a first request message used to subscribe to the NFV resource change notification. In other words, the EM registers (or subscribes to) the NFV resource change notification. Correspondingly, the VNFM replies to the EM with a response message. The first request message carries identification information of the first object set, and the first request message is used to request the VNFM to send the first notification message when a change of an NFV resource affects an object in the first object set.

The first object set may be the VNF running the highly-reliable service.

503. The VNFM registers the NFV resource change notification, and a VIM replies to the registration.

Specifically, the VNFM sends, to the VIM, a request message used to subscribe to the NFV resource change notification, to request the VIM to send the NFV resource change notification when an NFV resource is to change. Correspondingly, the VIM replies to the VNFM with a response message.

504. The VIM sends the NFV resource change notification to the VNFM.

Specifically, when an NFV resource is to change (for example, NFVI software upgrade, NFVI hardware repair, and NFVI hardware maintenance), the VIM sends, to the VNFM, a notification message used to indicate that the NFV resource is to change. The notification message carries an identifier of a virtual resource affected by the change of the NFV resource, and the NFV resource includes at least one of the following resources: a virtual computing resource, a virtual storage resource, and a virtual network resource.

505. The VNFM determines that an object affected by a change of an NFV resource belongs to a first object set.

Specifically, after obtaining the NFV resource change notification, the VNFM determines an object on the affected virtual resource, that is, determines the object affected by the change of the NFV resource. The affected object may be a VNF instance, a VNFC instance, or an NS instance. This embodiment of this application is not limited thereto. Then, the VNFM determines whether the affected object belongs to the first object set. When the affected object belongs to the first object set, the VNFM instructs the EM to perform service migration, and performs step 508.

Specifically, when the affected object belongs to the first object set, it indicates that reliability of a service in the object is relatively high, and service interruption needs to be avoided. Therefore, service migration needs to be performed to avoid service interruption.

When it is determined that the affected object does not belong to the first object set, it indicates that a highly-reliable service corresponding to the first object set is not affected, or an affected service has a tolerance to some extent, for example, short interruption is allowed. Therefore, virtual machine migration may be directly performed. In this case, step 506 may be performed to perform live migration on a virtual machine.

506. The VNFM sends a virtual machine live migration instruction to the VIM.

507. The VIM performs live migration on a virtual machine.

Specifically, the VIM migrates an affected virtual machine to a new virtual machine that is not affected by the change of the NFV resource.

508. The VNFM sends the NFV resource change notification to the EM.

For example, the VNFM sends the first notification message used to indicate NFV resource maintenance, where the first notification message carries identification information of the object affected by the change of the NFV resource.

509. The EM delivers an NFVI software and/or hardware modification policy.

Specifically, because the VNF does not have a service migration capability, the EM may instruct to modify NFVI software and/or hardware, to ensure that a service is not interrupted. Specifically, the EM sends, to the VNFM, a policy indication message used to request to modify NFVI software and/or hardware. The policy indication message carries second constraint information used to modify NFVI software and/or hardware. Specifically, for the second constraint information, refer to the foregoing description. Details are not described herein again.

510. The VNFM sends an NFVI software and/or hardware modification request to the VIM.

Specifically, the VNFM may determine a first constraint based on the second constraint. Then, the VNFM sends, to the VIM, a second request message used to request to modify NFVI software and/or hardware, where the second request message carries the first constraint information used to modify NFVI software and/or hardware. Specifically, for the first constraint information, refer to the foregoing description. Details are not described herein again.

511. The VIM modifies NFVI software and/or hardware.

Specifically, the VIM modifies the NFV resource software or hardware based on the first constraint information.

Optionally, in another embodiment, the VIM performs an operation of terminating a to-be-changed NFV resource (in this application, "to-be-changed" specifically means "is going to be changed"), and modifies NFVI software and/or hardware corresponding to the terminated NFV resource. For an action of terminating, by the VIM, the to-be-changed NFV resource, refer to a procedure in an existing standard, for example, refer to 7.3.1.5, 7.4.1.5, and 7.5.1.5 in ETSI GS NFV-IFA 005 V2.1.1 (2016-04) that respectively describe termination of a virtual computing resource, a virtual network resource, and a virtual storage resource. Termination herein may be understood as release of a binding relationship between the NFV resource and a user, and the terminated NFV resource cannot provide a service. The "modifying NFVI software and/or hardware corresponding to the terminated NFV resource" may be upgrade, deletion, adding, and the like of the software and/or hardware. For example, when the NFV resource is a virtual storage resource, corresponding NFVI software may be virtualization software, and modifying software may be upgrading the virtualization software. Corresponding NFVI hardware may be a hard disk or a flash memory, and modifying hardware may be modification such as adding a hard disk or a flash memory.

Optionally, in another embodiment, the performing, by the VIM, an operation of terminating a to-be-changed NFV resource includes: S1: terminating one or more basic NFV resource units in the to-be-changed NFV resource, where a quantity of remaining basic NFV resource units after the one or more basic NFV resource units in the to-be-changed NFV resource are terminated cannot be less than a predetermined minimum quantity; S2: removing the terminated NFV resource from a resource pool managed by the VIM, that is, removing an internal management object (internal management objects) corresponding to the terminated NFV resource. For a specific method for performing the "termination" action, refer to descriptions in the standard.

Optionally, in another embodiment, after learning that a service associated with the terminated to-be-changed NFV resource has been restored to a new NFV resource, the VIM performs the actions in S1 and S2, and modifies the NFVI software and/or hardware corresponding to the terminated NFV resource. The process is repeated, so that all to-be-changed NFV resources are terminated, modification of NFVI software and/or hardware corresponding to the terminated NFV resources is completed, and services associated with the terminated to-be-changed NFV resources are restored to new NFV resources.

For example, it is assumed that a user uses 10 basic NFV resource units respectively numbered 1, 2, 3, 4, . . . , and 10, and there are four to-be-changed basic NFV resource units respectively numbered 1, 2, 3, and 4. It is assumed that a predetermined minimum quantity is 8. In this case, step S1 may be first performed to terminate one or two basic NFV resource units (because a quantity of remaining basic NFV resource units after termination cannot be less than 8), for example, terminate two basic NFV resource units in this embodiment. Then, a removal operation in S2 is performed (to be specific, the two basic NFV resource units are removed from the resource pool managed by the VIM). Next, NFVI software and/or hardware corresponding to the terminated NFV resource are/is modified, so that the modified NFVI software and/or hardware can be used as a new NFV resource subsequently.

In addition, after the termination action in S1 and the removal action in S2 are performed, the EM may apply to the VIM for a new NFV resource by using the VNFM, and allocate the new NFV resource to the VNF; and the VNF restores, to the applied-for NFV resource, a part or all of a service associated with the terminated NFV resource (in other words, the service on the terminated NFV resource is restored to the applied-for new NFV resource). In this embodiment, two new NFV resources respectively numbered 11 and 12 may be applied for (certainly, more or fewer NFV resources may alternatively be applied for), and then, a part or all of services associated with the NFV resources numbered 1 and 2 may be restored to the NFV resources numbered 11 and 12.

In this application, the VIM monitors a running status of the VNF, and performs the termination operation in S1 and the removal operation in S2 after learning that the VNF restores the service. Specifically, because there are four to-be-changed basic NFV resource units, two basic NFV resource units need to be terminated subsequently. In this case, the foregoing process may be repeated. For example, basic NFV resource units numbered 3 and 4 are terminated and removed. Then, services associated with the basic NFV resource units numbered 3 and 4 are restored to a new NFV resource (namely, a basic NFV resource unit, for example, the services are restored to a new basic NFV resource unit numbered 13), and then NFVI software and/or hardware corresponding to the terminated NFV resources are/is modified.

Termination performed in this way can avoid, to a greatest extent, impact made on a service. To be specific, in a process of upgrading a basic NFV resource unit, some basic NFV resource units can still provide service support (for example, basic NFV resource units numbered 1 and 2 are terminated first, and basic NFV resource units numbered 3 to 10 can still provide service support).

512. The EM instructs the VNFM to perform VNF instantiation/scale-out, to restore the affected object to a state that is before deletion.

Specifically, the EM instructs the VNFM to create new VNF instantiation or perform VNF scale-out. For example, the EM sends a scale-out request to the VNFM, to request to restore the object affected by the change of the NFV resource to the state that is before deletion.

513. The VNFM applies to the VIM for a resource.

Specifically, after receiving the scale-out request, the VNFM sends a resource request to the VIM, to perform VNF scale-out or instantiation. After receiving the request, the VIM allocates a resource, to complete VNF instantiation or VNF scale-out.

514. The VNFM reports a VNF instantiation/scale-out result to the EM.

NFV resource NFV resource NFV resource NFV resource NFV resource NFV resource. Therefore, in this embodiment of this application, the service management plane EM registers with the VNFM to subscribe to a notification mechanism indicating that an NFV resource used by the VNF is to change due to NFVI software upgrade, VIM software upgrade, or the like, so that the EM can provide a constraint in software or hardware request signaling. In this way, a highly-reliable service is not interrupted when the NFVI changes, and normal running of the service is ensured.

It should be understood that FIG. 5A and FIG. 5B are merely an example of the embodiments of this application. Optionally, signaling messages in steps such as step 508 may further include a first resource change identifier, where the first resource change identifier may be used to indicate a number of the to-be-changed NFV resource.

Figure 6A:
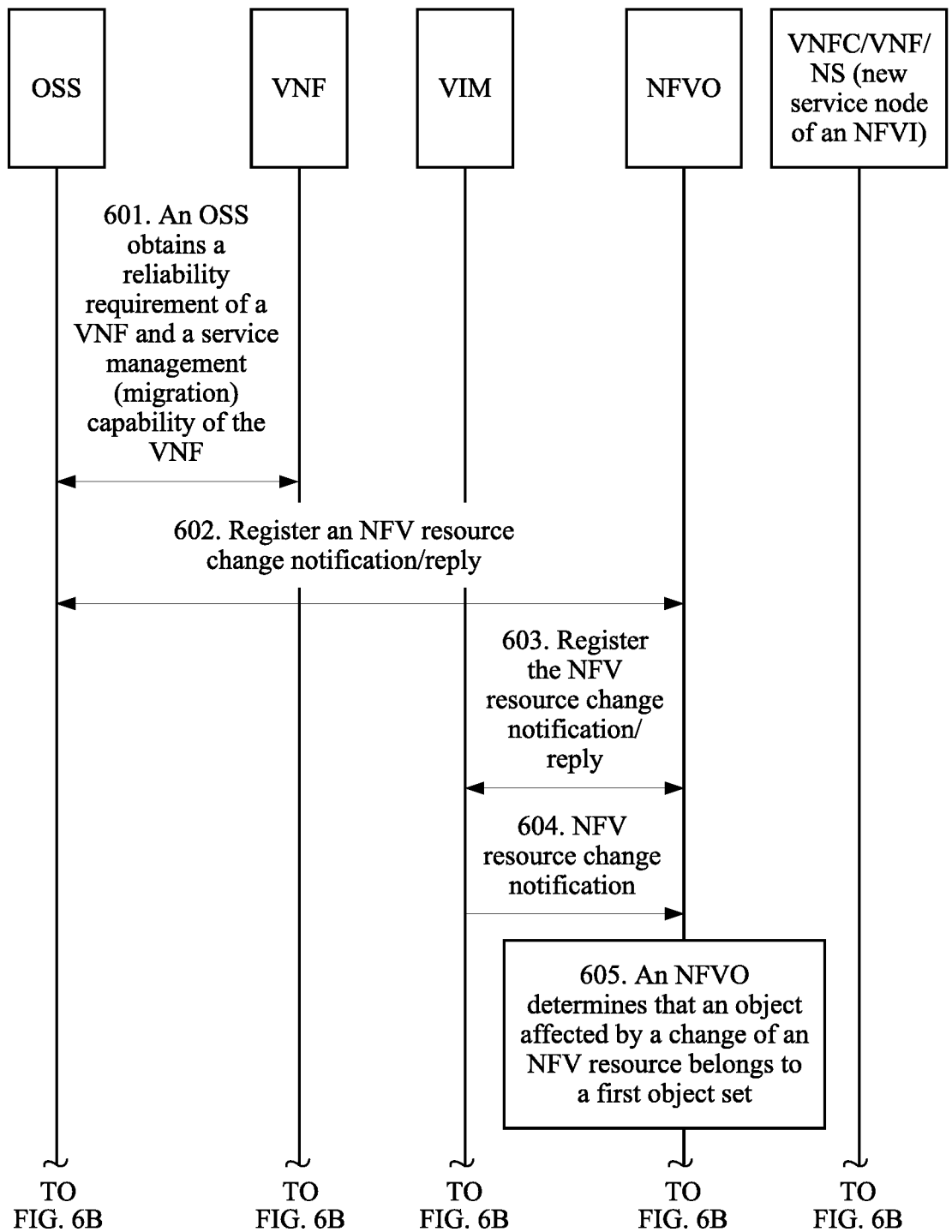
FIG. 6A and FIG. 6B are a flowchart of a service management method according to another embodiment of this application.
Figure 6B:
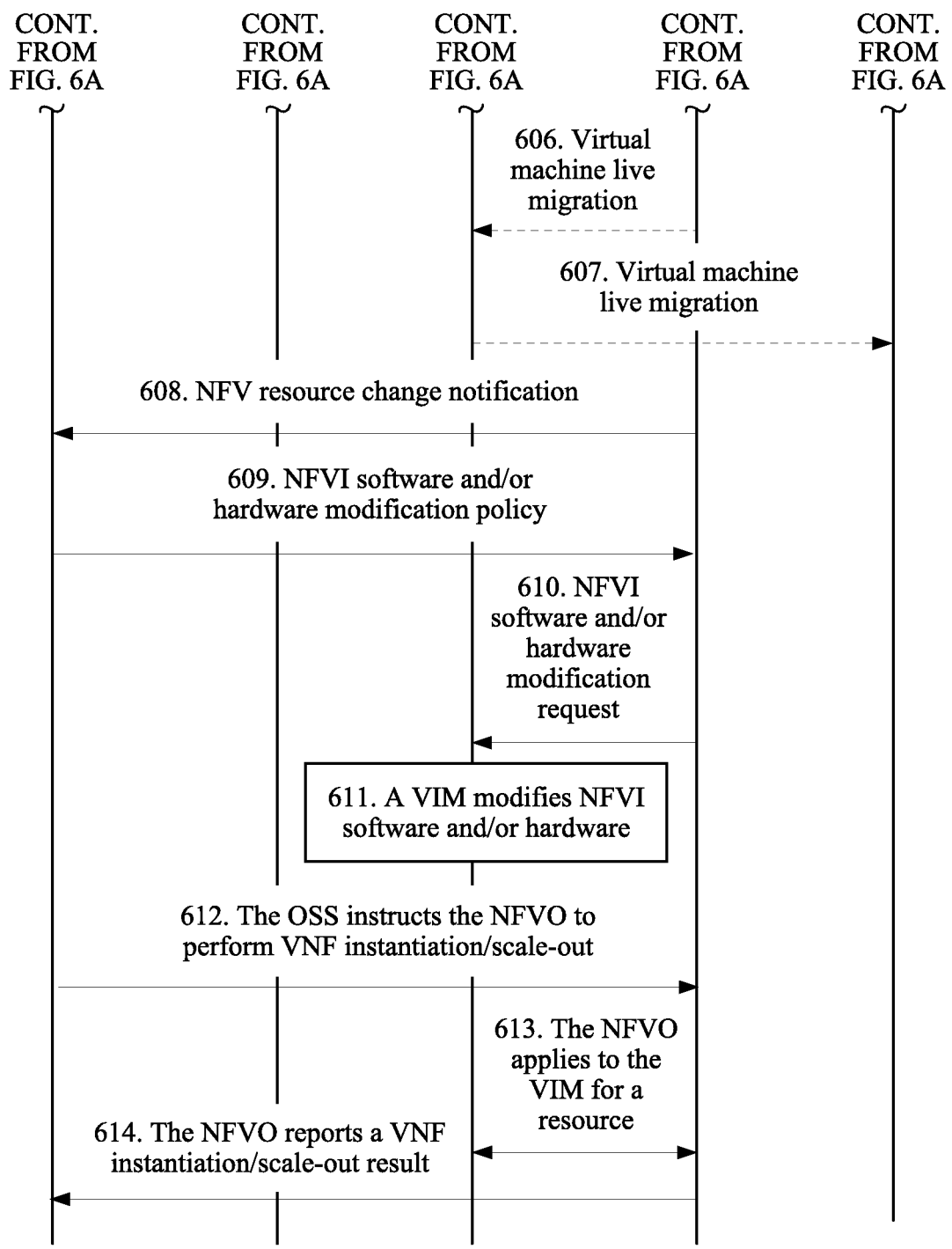

In a method shown in FIG. 6A and FIG. 6B, the NFVI software and/or hardware modification solution is described by using an example in which a first network element is an NFVO and a second network element is an OSS. Specifically, the method shown in FIG. 6A and FIG. 6B includes the following steps 601 to 612. It should be understood that the method shown in FIG. 6A and FIG. 6B is similar to that in FIG. 5A and FIG. 5B. Steps 601 to 612 are respectively corresponding to steps 501 to 512, and a difference lies in that the EM in FIG. 5A and FIG. 5B is replaced with the OSS and the VNFM in FIG. 5A and FIG. 5B is replaced with the NFVO to obtain the method in FIG. 6A and FIG. 6B. To avoid repetition, detailed descriptions are appropriately omitted in the steps in FIG. 6A and FIG. 6B. It should be understood that because the OSS cannot directly communicate with a VNF, a message or data transmitted between the OSS and the VNF in FIG. 6A and FIG. 6B needs to be forwarded by an EM. Specifically, after obtaining a message sent by the OSS (or the VNF), the EM may directly forward the message to the VNF (or the OSS), or the EM may forward a corresponding message after processing the message. This embodiment of this application is not limited thereto.

601. The OSS obtains a reliability requirement of a VNF and a service management (migration) capability of the VNF.

602. The OSS registers an NFV resource change notification, and the NFVO replies to the registration.

603. The NFVO registers the NFV resource change notification, and a VIM replies to the registration.

604. The VIM sends the NFV resource change notification to the NFVO.

605. The NFVO determines that an object affected by a change of an NFV resource belongs to a first object set.

The NFVO determines whether the affected object belongs to the first object set. When the affected object belongs to the first object set, the NFVO instructs the OSS to perform service migration, and performs step 608.

When it is determined that the affected object does not belong to the first object set, step 606 is performed to perform live migration on a virtual machine.

606. The NFVO sends a virtual machine live migration instruction to the VIM.

607. The VIM performs live migration on a virtual machine.

608. The NFVO sends the NFV resource change notification to the OSS.

609. The OSS delivers an NFVI software and/or hardware modification policy.

Specifically, because the VNF does not have a service migration capability, the OSS may instruct to modify NFVI software and/or hardware, to ensure that a service is not interrupted. It should be understood that step 609 may be similar to step 509, and the OSS sends, to the NFVO, a policy indication message used to request to modify NFVI software and/or hardware. The policy indication message carries second constraint information used to modify NFVI software and/or hardware. Specifically, for the second constraint information, refer to the foregoing description. Details are not described herein again.

Alternatively, for compatibility with an existing standard, in step 609, the EM may send the second constraint information by using signaling in the existing standard. For example, same as the signaling in step 409 or step 309, the EM sends a VNF instantiation/scale-out request message or a network service update (NS update) request message, where the request message carries the second constraint information. This embodiment of this application is not limited thereto.

610. The NFVO sends an NFVI software and/or hardware modification request to the VIM.

611. The VIM modifies NFVI software and/or hardware.

Specifically, the VIM modifies the NFV resource software or hardware based on first constraint information.

It should be understood that step 611 is corresponding to step 511 in FIG. 5B. For a manner in which the VIM modifies the NFVI software and/or hardware herein, refer to the description in step 511. A difference lies in that an action performed by the EM in step 511 is performed by the OSS instead, and an action performed by the VNFM in step 511 is replaced with an action performed by the NFVO, to obtain a specific implementation method in step 611. To avoid repetition, details are not described herein again.

612. The OSS instructs the NFVO to perform VNF instantiation/scale-out, to restore the affected object to a state that is before deletion.

Specifically, the OSS instructs the NFVO to create new VNF instantiation or VNF scale-out. For example, the OSS sends a scale-out request to the NFVO, to request to restore the object affected by the change of the NFV resource to the state that is before deletion.

613. The NFVO applies to the VIM for a resource.

Specifically, after receiving the scale-out request, the NFVO sends a resource request to the VIM, to perform VNF scale-out or instantiation. After receiving the request, the VIM allocates a resource, to complete VNF instantiation or VNF scale-out.

614. The NFVO reports a VNF instantiation/scale-out result to the OSS.

Therefore, in this embodiment of this application, the service management plane OSS registers with the NFVO to subscribe to a notification mechanism indicating that an NFV resource used by the VNF is to change due to NFVI software upgrade, VIM software upgrade, or the like, so that the OSS can provide a constraint in software or hardware request signaling. In this way, a highly-reliable service is not interrupted when the NFVI changes, and normal running of the service is ensured.

It should be understood that for content and usage of the messages in FIG. 5A, FIG. 5B, FIG. 6A, and FIG. 6B, refer to the foregoing corresponding descriptions in FIG. 2. To avoid repetition, details are not described herein again.

It should be understood that the foregoing examples in FIG. 2 to FIG. 6B are merely used to help a person skilled in the art understand the embodiments of the present invention, but are not intended to limit the embodiments of the present invention to a specific value or a specific scenario in the examples. A person skilled in the art apparently can make various equivalent modifications or changes according to the examples shown in FIG. 2 to FIG. 6B, and such modifications or changes also fall within the scope of the embodiments of the present invention. For example, an action performed by the EM in FIG. 5A and FIG. 5B may be performed by the VNF instead. This embodiment of this application is not limited thereto.

The foregoing describes in detail the service management methods in the embodiments of the present invention with reference to FIG. 1 to FIG. 6B, and the following describes service management devices in the embodiments of the present invention with reference to FIG. 7 to FIG. 11.

Figure 7:
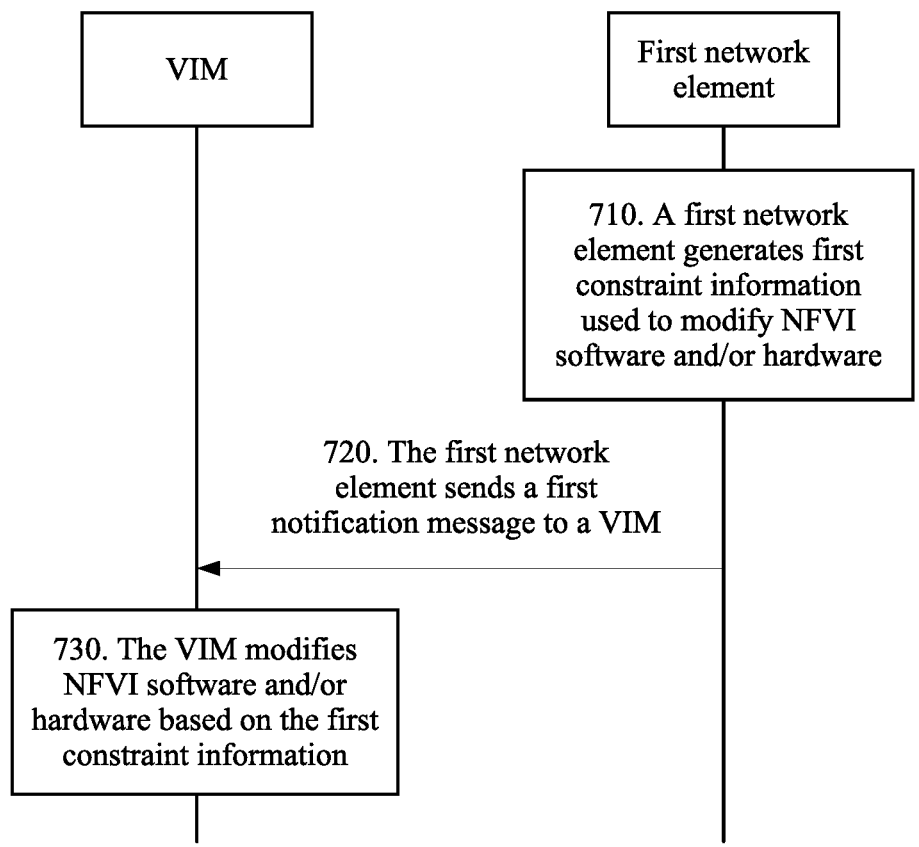
FIG. 7 is a flowchart of a service management method according to another embodiment of this application.

FIG. 7 is a schematic flowchart of a service management method according to another embodiment of the present invention. The method in FIG. 7 may be applicable to an NFV system 100 shown in FIG. 1, and a method 700 shown in FIG. 7 includes the following steps.

710. A first network element generates first constraint information used to modify NFVI software and/or hardware.

720. The first network element sends a first notification message to a VIM.

Correspondingly, the VIM receives the first notification message.

The first notification message carries the first constraint information.

It should be understood that in this embodiment of this application, the first notification message may be sent by using a protocol and a format in an existing standard, and this is not limited in this embodiment of this application. For example, the first notification message may be sent in a form such as a restful protocol format, and this embodiment of this application is not limited thereto.

It should also be understood that formats or forms of the other messages in this embodiment of this application are not limited, and the other messages may be sent according to a stipulation in the existing standard.

730. The VIM modifies NFVI software and/or hardware based on the first constraint information.

Specifically, when an NFV resource needs to change, the first network element receives a notification message indicating that the NFV resource is to change. For example, when the NFV resource needs to change, the VIM sends the resource change notification message, where the notification message indicates that the NFV resource needs to change. Then, the first network element may generate the first constraint information used to modify NFVI software and/or hardware, and send the first constraint information to the VIM by using the first notification message; and further, the VIM may modify the NFVI software and/or hardware based on the first constraint information.

Therefore, in this embodiment of this application, when an NFV resource is to change, the first network element sends, to the VIM, the constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

Optionally, in another embodiment, the first network element is an NFV orchestrator NFVO, or the first network element is a VNF manager VNFM.

It should be understood that because a communications interface exists between the VIM and the VNFM and between the VIM and the NFVO, and a communications interface also exists between the VNFM and the NFVO, a message sent by the VIM and received by the VNFM may be directly received, or may be indirectly received by using the NFVO (transit).

For example, when the first network element is an NFV orchestrator NFVO, the NFV resource change notification may be received by the NFVO directly by using the VIM; or when the first network element is a VNF manager VNFM, the NFV resource change notification is received by the VNFM directly by using the VIM, or the NFV resource change notification is received by the VNFM indirectly by using an NFVO.

Similarly, when the first network element is a VNFM, a message sent by the VNFM to the VIM, for example, a reply message, may be directly sent, or may be indirectly sent by using the NFVO. This embodiment of this application is not limited thereto.

Optionally, in an embodiment, before step 710, the method may further include:

receiving, by the first network element, a subscription request message sent by the VIM, where the subscription request message is used to subscribe to constraint information used to modify NFVI software and/or hardware; and sending, by the first network element, a reply message to the VIM, where the reply message is used to indicate that the VIM successfully subscribes to the constraint information.

Specifically, the VIM first sends the subscription request message to the first network element, to register and subscribe to the constraint information used to modify NFVI software and/or hardware. After obtaining and receiving the notification message indicating that the NFV resource is to change, the first network element generates, based on the subscription of the VIM, the first constraint information used to modify NFVI software and/or hardware, and sends the first constraint information to the VIM by using the first notification message; and further, the VIM may modify the NFVI software and/or hardware based on the first constraint information.

It should be understood that in the foregoing description of this embodiment of this application, information is first subscribed to by using the subscription request message, and then the first network element sends the first notification message only after obtaining the NFV resource change notification. This manner can satisfy a stipulation in an existing standard, that is, a requirement that a notification is sent after subscription can satisfy a procedure in the existing standard. Optionally, in this embodiment of this application, the VIM may not send the subscription request message, and the first network element may send the first notification message to the VIM after obtaining the NFV resource change notification. Although this manner does not satisfy the standard procedure, in this case, signaling overheads between network elements can be reduced and system performance can be improved. This embodiment of this application is not limited thereto.

Optionally, in another embodiment, the first constraint information includes a change identifier (for example, a changeID in the existing standard) of an NFV resource. The NFV resource includes at least one NFV resource group, the NFV resource group includes at least one basic NFV resource unit, and the basic NFV resource unit is a basic unit for virtual computing, a basic unit for virtual storage, or a basic unit for virtual communication. The change identifier of the NFV resource is corresponding to a number that is of a to-be-changed NFV resource and that is carried in the NFV resource change notification sent by the VIM, and the NFV resource includes the to-be-changed NFV resource.

The first constraint information further includes at least one piece of the following information:

an identifier (for example, a VirtualizedResourceID in the existing standard) of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

Optionally, in an embodiment, the NFV resource includes a virtual computing resource, and the basic NFV resource unit is a virtual computing container; or the NFV resource includes a virtual storage resource, and the basic NFV resource unit is a virtual storage container; or the NFV resource includes a virtual communication resource, and the basic NFV resource unit is a virtual link VL.

It should be understood that the NFV resource in this embodiment of this application may include one or more of a virtual computing resource, a virtual storage resource, and a virtual communication resource. Each group of virtual resource may include one or more resource groups, and each resource group may include one or more basic resource units. This embodiment of this application is not limited thereto.

Optionally, in an embodiment, in step 710, after receiving the NFV resource change notification sent by the VIM, the first network element queries for real-time running status data of a virtualized network function VNF, and generates second constraint information based on a virtualized network function descriptor VNFD; and the first network element converts the second constraint information into the first constraint information.

Optionally, in another embodiment, the second constraint information includes at least one of the following parameters: an identifier of at least one VNF instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in an NFV resource software or hardware modification process, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, a minimum quantity of virtual links VLs that need to be reserved in each of the at least one group of virtual link VL in the NFV resource software or hardware modification process, and a condition for constraining migration of the VNFC.

Optionally, in another embodiment, the generating second constraint information based on a virtualized network function descriptor VNFD includes: generating, by the first network element, the second constraint information by using a VNF life cycle management script carried in the VNFD; and the converting, by the first network element, the second constraint information into the first constraint information includes: converting, by the first network element, the second constraint into the first constraint information based on a correspondence between a VNF instance and an NFV resource.

For example, the first network element obtains, from a VNF software package, an applet that can generate the second constraint information, where the applet can generate, by querying a database of the VNF instance, an NFVI software and/or hardware modification policy (namely, the second constraint information). The first network element generates the second constraint information by using the applet, and then converts the second constraint information into the first constraint information.

For example, a VNF software vendor makes the applet, and adds the applet to the VNF software package for publishing. The applet can implement the following function: calculating and obtaining the NFVI software and/or hardware modification policy (corresponding to the second constraint information) by querying for real-time running status data of a VNF. When delivering a VNF instantiation request to the first network element, the second network element adds the VNF life cycle management script (script) or a VNF monitoring indicator to the VNFD specified by the request message. When receiving an event indicating that the NFV resource is to change due to software or hardware or daily maintenance, the first network element triggers execution of the VNF life cycle management script (script), and the VNF life cycle management script (script) triggers the VNFM to execute the applet for the policy or constraint used to modify NFVI software and/or hardware, to generate the second constraint information through calculation, and convert the second constraint information into the first constraint information.

Optionally, in another embodiment, in step 730, the VIM may modify the NFVI software and/or hardware based on the following process:

The VIM performs an operation of terminating a to-be-changed NFV resource (in this application, "changed" specifically means "to be changed"), and modifies NFVI software and/or hardware corresponding to the terminated NFV resource. For an action of terminating, by the VIM, the to-be-changed NFV resource, refer to a procedure in the existing standard, for example, refer to 7.3.1.5, 7.4.1.5, and 7.5.1.5 in ETSI GS NFV-IFA 005 V2.1.1 (2016-04) that respectively describe termination of a virtual computing resource, a virtual network resource, and a virtual storage resource. Termination herein may be understood as release of a binding relationship between the NFV resource and a user, and the terminated NFV resource cannot provide a service. The "modifying NFVI software and/or hardware corresponding to the terminated NFV resource" may be upgrade, deletion, adding, and the like of the software and/or hardware. For example, when the NFV resource is a virtual storage resource, corresponding NFVI software may be virtualization software, and modifying software may be upgrading the virtualization software. Corresponding NFVI hardware may be a hard disk or a flash memory, and modifying hardware may be modification such as adding a hard disk or a flash memory.

Optionally, in another embodiment, the performing, by the VIM, an operation of terminating a to-be-changed NFV resource includes: S1: terminating one or more basic NFV resource units in the to-be-changed NFV resource, where a quantity of remaining basic NFV resource units after the one or more basic NFV resource units in the to-be-changed NFV resource are terminated cannot be less than a predetermined minimum quantity; S2: removing the terminated NFV resource from a resource pool managed by the VIM, that is, removing an internal management object (internal management objects) corresponding to the terminated NFV resource. For a specific method for performing the "termination" action, refer to descriptions in the standard.

Optionally, in another embodiment, after learning that a service associated with the terminated to-be-changed NFV resource has been restored to a new NFV resource, the VIM performs the actions in S1 and S2, and modifies the NFVI software and/or hardware corresponding to the terminated NFV resource. The process is repeated, so that all to-be-changed NFV resources are terminated, modification of NFVI software and/or hardware corresponding to the terminated NFV resources is completed, and services associated with the terminated to-be-changed NFV resources are restored to new NFV resources.

For example, it is assumed that a user uses 10 basic NFV resource units respectively numbered 1, 2, 3, 4, . . . , and 10, and there are four to-be-changed basic NFV resource units respectively numbered 1, 2, 3, and 4. It is assumed that a predetermined minimum quantity is 8. In this case, step S1 may be first performed to terminate one or two basic NFV resource units (because a quantity of remaining basic NFV resource units after termination cannot be less than 8), for example, terminate two basic NFV resource units in this embodiment. Then, a removal operation in S2 is performed (to be specific, the two basic NFV resource units are removed from the resource pool managed by the VIM). Next, NFVI software and/or hardware corresponding to the terminated NFV resource are/is modified, so that the modified NFVI software and/or hardware can be used as a new NFV resource subsequently.

In addition, after the termination action in S1 and the removal action in S2 are performed, an EM may apply to the VIM for a new NFV resource by using the VNFM, and allocate the new NFV resource to the VNF; and the VNF restores, to the applied-for NFV resource, a part or all of a service associated with the terminated NFV resource (in other words, the service on the terminated NFV resource is restored to the applied-for new NFV resource). In this embodiment, two new NFV resources respectively numbered 11 and 12 may be applied for (certainly, more or fewer NFV resources may alternatively be applied for), and then, a part or all of services associated with the NFV resources numbered 1 and 2 may be restored to the NFV resources numbered 11 and 12.

In this application, the VIM monitors a running status of the VNF, and performs the termination operation in S1 and the removal operation in S2 after learning that the VNF restores the service. Specifically, because there are four to-be-changed basic NFV resource units, two basic NFV resource units need to be terminated subsequently. In this case, the foregoing process may be repeated. For example, basic NFV resource units numbered 3 and 4 are terminated and removed. Then, services associated with the basic NFV resource units numbered 3 and 4 are restored to a new NFV resource (namely, a basic NFV resource unit, for example, the services are restored to a new basic NFV resource unit numbered 13), and then NFVI software and/or hardware corresponding to the terminated NFV resources are/is modified.

Termination performed in this way can avoid, to a greatest extent, impact made on a service. To be specific, in a process of upgrading a basic NFV resource unit, some basic NFV resource units can still provide service support (for example, basic NFV resource units numbered 1 and 2 are terminated first, and basic NFV resource units numbered 3 to 10 can still provide service support).

Optionally, in another embodiment, after the VIM completes modification of the NFVI software and/or hardware, the method 700 may further include:

instructing, by the second network element, the first network element to create a VNF instance or perform VNF scale-out, to restore an affected object to a state that is before deletion. For example, the second network element sends an NFV instantiation/scale-out request to the first network element; and after obtaining the VNF instantiation/scale-out request sent by the second network element, the first network element applies to the VIM for a resource. For example, after receiving the scale-out request, the VNFM sends a resource request to the VIM, to perform VNF scale-out or instantiation. After receiving the request, the VIM allocates a resource, to complete VNF instantiation or VNF scale-out. Finally, the VNFM reports a VNF instantiation/scale-out result to the EM.

The foregoing describes, with reference to FIG. 7, a solution in this embodiment of this application that when an NFV resource is to change, the VIMN generates an NFVI modification policy based on the first network element and performs NFVI modification.

Figure 8:
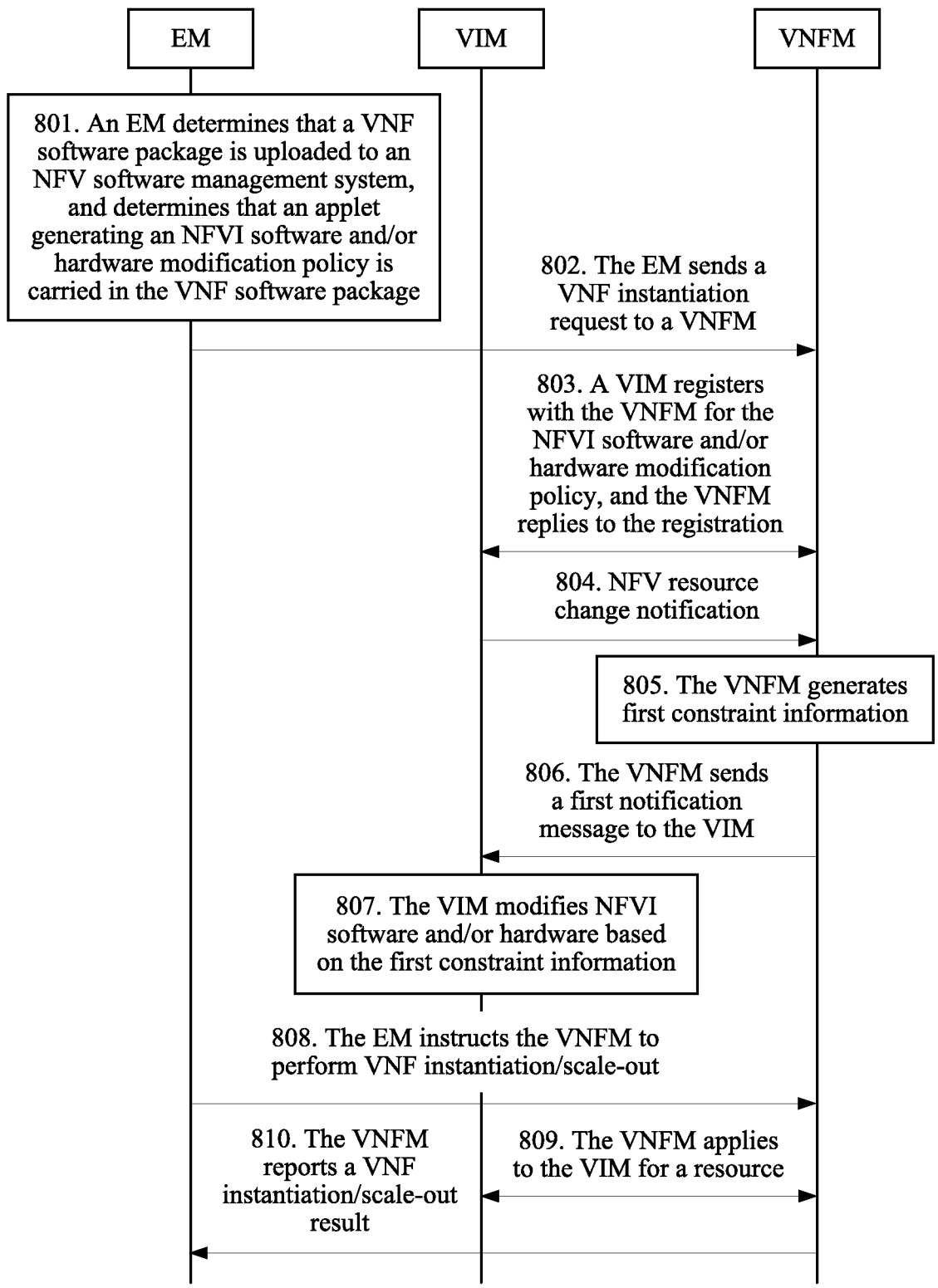
FIG. 8 is a flowchart of a service management method according to another embodiment of this application.
Figure 9:
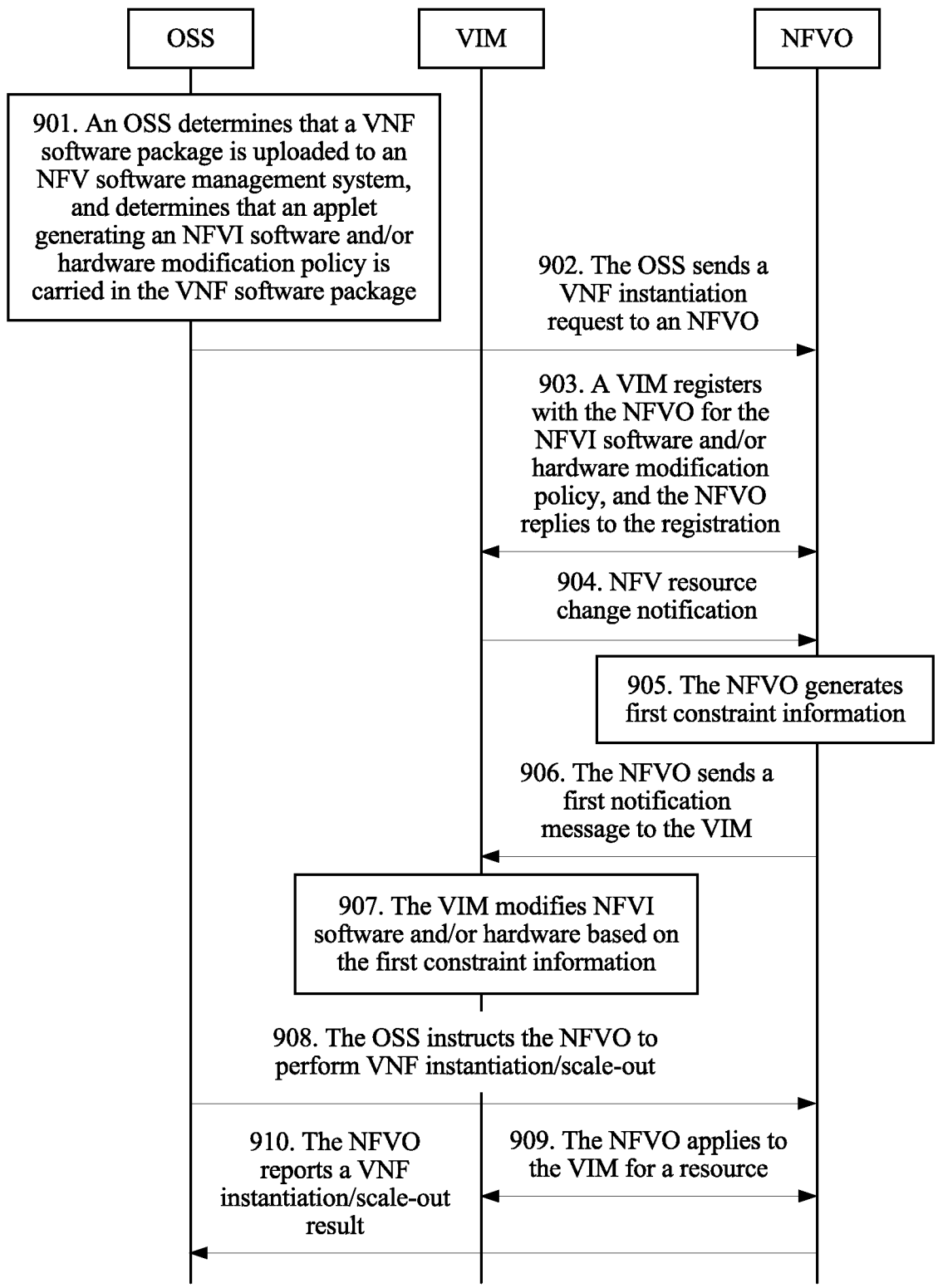
FIG. 9 is a flowchart of a service management method according to another embodiment of this application.

The following describes in detail the service management method in the embodiments of this application in different cases with reference to specific examples in FIG. 8 and FIG. 9. The service management method in the embodiments of this application is described with reference to FIG. 8 and by using an example in which a first network element is a VNFM and a second network element is an EM, and with reference to FIG. 9 and by using an example in which a first network element is an NFVO and a second network element is an OSS.

In a method shown in FIG. 8, the NFVI software and/or hardware modification solution is described by using an example in which a first network element is a VNFM and a second network element is an EM. Specifically, the method shown in FIG. 8 includes the following steps.

801. The EM determines that a VNF software package is uploaded to an NFV software management system, and determines that an applet generating an NFVI software and/or hardware modification policy is carried in the VNF software package.

For example, a VNF software vendor makes the applet, and adds the applet to the VNF software package for publishing. The applet can implement the following function: calculating and obtaining the NFVI software and/or hardware modification policy (namely, second constraint information) by querying for real-time running status data of a VNF.

The EM checks and determines that the VNF software package is uploaded to the NFV software management system, and determines that the applet generating the NFVI software and/or hardware modification policy is carried in the VNF software package.

For a limitation of the second constraint information, refer to the foregoing description in FIG. 7. Details are not described herein again.

802. The EM sends a VNF instantiation request to the VNFM.

Specifically, after receiving the VNF instantiation request, the VNFM performs VNF instantiation, and adds a VNF life cycle management script (script) or a VNF monitoring indicator to a VNFD.

803. A VIM registers with the VNFM for the NFVI software and/or hardware modification policy, and the VNFM replies to the registration.

Specifically, the VNFM receives a subscription request message sent by the VIM, where the subscription request message is used to subscribe to constraint information used to modify NFVI software and/or hardware.

804. The VIM sends an NFV resource change notification to the VNFM.

Specifically, when an NFV resource is to change (for example, because NFVI software and/or hardware needs to be modified (for example, NFVI software upgrade, NFVI hardware repair, or NFVI hardware maintenance), an NFV resource provided by the NFVI software and/or hardware needs to be maintained, leading to a change of the NFV resource provided by the NFVI software and/or hardware), the VIM sends, to the VNFM, a notification message used to indicate that the NFV resource is to change, where the notification message indicates that the NFV resource is to change.

Optionally, the resource change notification message carries a notification number and an identifier of the to-be-changed resource.

805. The VNFM generates first constraint information.

Specifically, after obtaining an NFV resource change notification event, the VNFM executes the applet, queries for real-time running status data of the VNF, generates the second constraint information based on the virtualized network function descriptor VNFD, and generates the first constraint information based on the second constraint information.

For example, after obtaining the NFV resource change notification event sent by the VIM, the VNFM triggers execution of the VNF life cycle management script (script), and the VNF life cycle management script (script) triggers the VNFM to execute the applet that is used to calculate a policy or a constraint used to modify NFVI software and/or hardware, to calculate and obtain the NFVI software and/or hardware modification policy (namely, the second constraint information) by querying for the real-time running status data of the VNF, and then convert the second constraint information into the first constraint information. For example, the first network element converts the second constraint into the first constraint information based on a correspondence between a VNF instance and an NFV resource.

Specifically, for the first constraint information, namely, the limitation of the second constraint information, refer to the descriptions in FIG. 7. Details are not described herein again.

806. The VNFM sends a first notification message to the VIM.

The first notification message carries the first constraint information.

807. The VIM modifies NFVI software and/or hardware based on the first constraint information.

Specifically, the VIM modifies the NFVI software and/or hardware in the following manner:

The VIM performs an operation of terminating a to-be-changed NFV resource (in this application, "changed" specifically means "to be changed"), and modifies NFVI software and/or hardware corresponding to the terminated NFV resource. For an action of terminating, by the VIM, the to-be-changed NFV resource, refer to a procedure in an existing standard, for example, refer to 7.3.1.5, 7.4.1.5, and 7.5.1.5 in ETSI GS NFV-IFA 005 V2.1.1 (2016-04) that respectively describe termination of a virtual computing resource, a virtual network resource, and a virtual storage resource. Termination herein may be understood as release of a binding relationship between the NFV resource and a user, and the terminated NFV resource cannot provide a service. The "modifying NFVI software and/or hardware corresponding to the terminated NFV resource" may be upgrade, deletion, adding, and the like of the software and/or hardware. For example, when the NFV resource is a virtual storage resource, corresponding NFVI software may be virtualization software, and modifying software may be upgrading the virtualization software. Corresponding NFVI hardware may be a hard disk or a flash memory, and modifying hardware may be modification such as adding a hard disk or a flash memory.

Optionally, in another embodiment, the performing, by the VIM, an operation of terminating a to-be-changed NFV resource includes: S1: terminating one or more basic NFV resource units in the to-be-changed NFV resource, where a quantity of remaining basic NFV resource units after the one or more basic NFV resource units in the to-be-changed NFV resource are terminated cannot be less than a predetermined minimum quantity; S2: removing the terminated NFV resource from a resource pool managed by the VIM, that is, removing an internal management object (internal management objects) corresponding to the terminated NFV resource. For a specific method for performing the "termination" action, refer to descriptions in the standard.

Optionally, in another embodiment, after learning that a service associated with the terminated to-be-changed NFV resource has been restored to a new NFV resource, the VIM performs the actions in S1 and S2, and modifies the NFVI software and/or hardware corresponding to the terminated NFV resource. The process is repeated, so that all to-be-changed NFV resources are terminated, modification of NFVI software and/or hardware corresponding to the terminated NFV resources is completed, and services associated with the terminated to-be-changed NFV resources are restored to new NFV resources.

For example, it is assumed that a user uses 10 basic NFV resource units respectively numbered 1, 2, 3, 4, . . . , and 10, and there are four to-be-changed basic NFV resource units respectively numbered 1, 2, 3, and 4. It is assumed that a predetermined minimum quantity is 8. In this case, step S1 may be first performed to terminate one or two basic NFV resource units (because a quantity of remaining basic NFV resource units after termination cannot be less than 8), for example, terminate two basic NFV resource units in this embodiment. Then, a removal operation in S2 is performed (to be specific, the two basic NFV resource units are removed from the resource pool managed by the VIM). Next, NFVI software and/or hardware corresponding to the terminated NFV resource are/is modified, so that the modified NFVI software and/or hardware can be used as a new NFV resource subsequently.

In addition, after the termination action in S1 and the removal action in S2 are performed, the EM may apply to the VIM for a new NFV resource by using the VNFM, and allocate the new NFV resource to the VNF; and the VNF restores, to the applied-for NFV resource, a part or all of a service associated with the terminated NFV resource (in other words, the service on the terminated NFV resource is restored to the applied-for new NFV resource). In this embodiment, two new NFV resources respectively numbered 11 and 12 may be applied for (certainly, more or fewer NFV resources may alternatively be applied for), and then, a part or all of services associated with the NFV resources numbered 1 and 2 may be restored to the NFV resources numbered 11 and 12.

In this application, the VIM monitors a running status of the VNF, and performs the termination operation in S1 and the removal operation in S2 after learning that the VNF restores the service. Specifically, because there are four to-be-changed basic NFV resource units, two basic NFV resource units need to be terminated subsequently. In this case, the foregoing process may be repeated. For example, basic NFV resource units numbered 3 and 4 are terminated and removed. Then, services associated with the basic NFV resource units numbered 3 and 4 are restored to a new NFV resource (namely, a basic NFV resource unit, for example, the services are restored to a new basic NFV resource unit numbered 13), and then NFVI software and/or hardware corresponding to the terminated NFV resources are/is modified.

Termination performed in this way can avoid, to a greatest extent, impact made on a service. To be specific, in a process of upgrading a basic NFV resource unit, some basic NFV resource units can still provide service support (for example, basic NFV resource units numbered 1 and 2 are terminated first, and basic NFV resource units numbered 3 to 10 can still provide service support).

808. The EM instructs the VNFM to perform VNF instantiation/scale-out, to restore an affected object to a state that is before deletion.

Specifically, the EM instructs the VNFM to create new VNF instantiation or perform VNF scale-out. For example, the EM sends a scale-out request to the VNFM, to request to restore the object affected by the change of the NFV resource to the state that is before deletion.

809. The VNFM applies to the VIM for a resource.

Specifically, after receiving the scale-out request, the VNFM sends a resource request to the VIM, to perform VNF scale-out or instantiation. After receiving the request, the VIM allocates a resource, to complete VNF instantiation or VNF scale-out.

810. The VNFM reports a VNF instantiation/scale-out result to the EM.

Therefore, in this embodiment of this application, when the NFV resource is to change, the VNFM sends the NFVI modification policy to the VIM, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

In a method shown in FIG. 9, the NFVI software and/or hardware modification solution is described by using an example in which a first network element is an NFVO and a second network element is an OSS. It should be understood that the solution in FIG. 9 is similar to that in FIG. 8, and a difference lies in that in FIG. 9, the first network element is the NFVO and the second network element is the OSS, but in FIG. 8, the first network element is the VNFM and the second network element is the EM. For actions performed by the first network element, the second network element, and the VIM in FIG. 9, refer to the descriptions in FIG. 8. To avoid repetition, detailed descriptions are appropriately omitted herein. Specifically, the method shown in FIG. 9 includes the following steps.

901. The OSS determines that a VNF software package is uploaded to an NFV software management system, and determines that an applet generating an NFVI software and/or hardware modification policy is carried in the VNF software package.

902. The OSS sends a VNF instantiation request to the NFVO.

903. A VIM registers with the NFVO for the NFVI software and/or hardware modification policy, and the NFVO replies to the registration.

904. The VIM sends an NFV resource change notification to the NFVO.

905. The NFVO generates first constraint information.

906. The NFVO sends a first notification message to the VIM.

907. The VIM modifies NFVI software and/or hardware based on the first constraint information.

908. The OSS instructs the NFVO to perform VNF instantiation/scale-out, to restore an affected object to a state that is before deletion.

909. The NFVO applies to the VIM for a resource.

910. The NFVO reports a VNF instantiation/scale-out result to the OSS.

Therefore, in this embodiment of this application, when an NFV resource is to change, the NFVO sends the NFVI modification policy to the VIM, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

It should be understood that the foregoing examples in FIG. 7 to FIG. 9 are merely used to help a person skilled in the art understand the embodiments of the present invention, but are not intended to limit the embodiments of the present invention to a specific value or a specific scenario in the examples. A person skilled in the art apparently can make various equivalent modifications or changes according to the examples shown in FIG. 7 to FIG. 9, and such modifications or changes also fall within the scope of the embodiments of the present invention.

It should be understood that in the foregoing embodiments, sequence numbers of the processes do not represent an execution sequence. The execution sequence of the processes should be determined according to functions and internal logic of the processes. The sequence numbers should be construed as any limitation on the implementation processes of the embodiments of the present invention.

It should also be understood that FIG. 2 to FIG. 9 in the foregoing description may be independent examples. Optionally, a person skilled in the art may perform variations, such as combining, nesting, or integrating, on the examples in FIG. 2 to FIG. 9, and such modifications or changes also fall within the scope of the embodiments of the present invention.

It should also be understood that "first" and "second" in this specification are merely used for differentiation, and should not be considered as a limitation on this application. It should also be understood that in the embodiments of this application, terms of messages can be flexibly changed provided that functions of the messages are the functions of the messages described above. The embodiments of this application are not limited thereto. For example, the "notification message" may also be referred to as an indication message, a request message, a notification, a notification indication, a first message, and a second message. The "request message" may also be referred to as an indication message, a notification message, a notification, a notification indication, a first message, and a second message. The "policy indication message" may also be referred to as a notification message, an indication message notification, a notification indication, a first message, and a second message.

Figure 10:
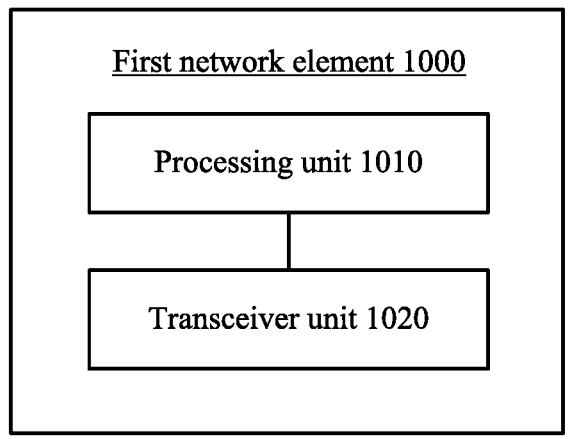
FIG. 10 is a schematic block diagram of a first network element according to an embodiment of this application.

FIG. 10 is a schematic block diagram of a first network element according to an embodiment of the present invention. A first network element 1000 shown in FIG. 10 includes a processing unit 1010 and a transceiver unit 1020.

Specifically, the processing unit is configured to determine an object affected by a change of a network function virtualization NFV resource, where the object affected by the change of the NFV resource is a virtualized network function VNF instance, a virtualized network function component VNFC instance, or a network service NS instance associated with the virtualized network function VNF instance, and the NFV resource includes at least one of the following resources: a virtual computing resource, a virtual storage resource, and a virtual network resource.

The transceiver unit is configured to send, to a second network element, a first notification message used to indicate NFV resource maintenance, where the first notification message carries identification information of the object affected by the change of the NFV resource, so that the second network element manages a service in the object affected by the change of the NFV resource.

Therefore, in this embodiment of this application, when the NFV resource is to change, the first network element reports the first notification message to the second network element, and the second network element manages the service in the object affected by the change of the NFV resource, to avoid impact made by the change of the NFV resource on the service, ensure normal running of the service, and improve user experience.

Optionally, in another embodiment, the transceiver unit is further configured to: before sending, to the second network element, the first notification message used to indicate NFV resource maintenance, receive a first request message that is used to subscribe to an NFV resource maintenance notification and that is sent by the second network element, where the first request message is used to request the first network element to send the first notification message when the NFV resource is to change.

Optionally, in another embodiment, the first request message carries identification information of a first object set, and the first object set includes at least one of the following objects: a virtualized network function VNF instance, a virtualized network function component VNFC instance, and a network service NS instance associated with the virtualized network function VNF instance; and the transceiver unit is specifically configured to: when it is determined that the object affected by the change of the NFV resource belongs to the first object set, send, to the second network element, the first notification message used to indicate NFV resource maintenance.

Optionally, in another embodiment, the first request message further carries an additional parameter, and the additional parameter includes at least one of the following parameters: event information indicating that the NFV resource is to change, an attribute of the to-be-changed NFV resource, and a time that needs to be reserved for processing due to the change of the NFV resource. The attribute of the to-be-changed NFV resource indicates that the to-be-changed NFV resource is a virtual computing resource, a virtual storage resource, or a virtual network resource, and the event information indicating that the NFV resource is to change includes at least one piece of the following information: NFVI software upgrade, NFVI hardware repair, and NFVI hardware maintenance.

The additional parameter and the identification information of the first object set are carried in a filter in the first request message.

The first notification message further includes at least one type of parameter in the additional parameter to which the second network element subscribes and that is corresponding to the to-be-changed NFV resource.

Optionally, in another embodiment, the transceiver unit is further configured to: after sending, to the second network element, the first notification message used to indicate NFV resource maintenance, send, to a virtualized infrastructure manager VIM, a second request message used to request to modify NFVI software and/or hardware, where the second request message carries first constraint information used to modify NFVI software and/or hardware.

Optionally, in another embodiment, the first notification message further carries a number of the to-be-changed NFV resource. The first constraint information includes a second change identifier of an NFV resource. The NFV resource includes at least one NFV resource group, the NFV resource group includes at least one basic NFV resource unit, and the basic NFV resource unit is a basic unit for virtual computing, a basic unit for virtual storage, or a basic unit for virtual communication. The second change identifier of the NFV resource is corresponding to the number that is of the to-be-changed NFV resource and that is carried in the first notification message, and the NFV resource includes the to-be-changed NFV resource.

The first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

Optionally, in another embodiment, the NFV resource includes a virtual computing resource, and the basic unit for virtual computing is a virtual computing container; or the NFV resource includes a virtual storage resource, and the basic unit for virtual storage is a virtual storage container; or the NFV resource includes a virtual communication resource, and the basic unit for virtual communication is a virtual link VL.

Optionally, in another embodiment, the transceiver unit is further configured to: before sending, to the VIM, the second request message used to request to modify NFVI software and/or hardware, receive a policy indication message that is used to modify NFVI software and/or hardware and that is sent by the second network element, where the policy indication message carries second constraint information used to modify NFVI software and/or hardware, and the first constraint information is generated by the processing unit by converting the second constraint information.

Optionally, in another embodiment, the first notification message further carries the number of the to-be-changed NFV resource, and the second constraint information includes a first change identifier of an NFV resource and at least one of the following parameters: an identifier of an NS instance, an identifier of at least one VNF instance in the NS instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in the NFVI software and/or hardware modification process, a condition for constraining migration of the VNFC, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, and a minimum quantity of virtual links VLs that need to be reserved in each of the at least one group of virtual link VL in the NFVI software and/or hardware modification process. The first change identifier of the NFV resource is corresponding to the number that is of the to-be-changed NFV resource and that is carried in the first notification message, and the object affected by the change of the NFV resource belongs to the NS instance, the at least one VNF instance in the NS instance, or the at least one group of VNFC instance in the at least one VNF instance.

Optionally, in another embodiment, the first network element is an NFV orchestrator NFVO, and the second network element is an operations support system OSS; or the first network element is a VNF manager VNFM, and the second network element is an element management system EM.

It should be understood that the first network element shown in FIG. 10 can implement the processes of the first network element in the method embodiments in FIG. 2 to FIG. 6B. Operations and/or functions of the modules in the first network element 1000 are respectively used to implement corresponding procedures in the method embodiments in FIG. 2 to FIG. 6B. For details, refer to the descriptions in the method embodiments. To avoid repetition, detailed descriptions are appropriately omitted herein.

Figure 11:
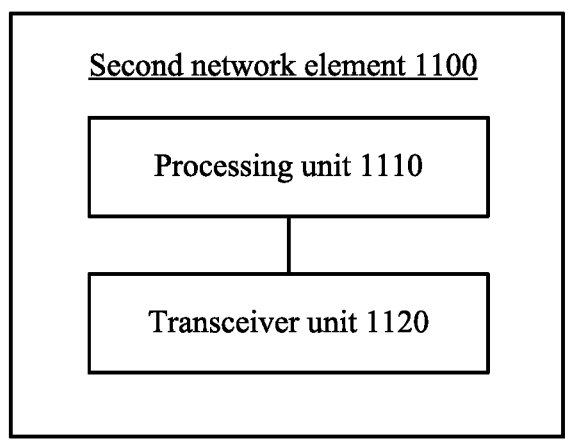
FIG. 11 is a schematic block diagram of a second network element according to an embodiment of this application.

FIG. 11 is a schematic block diagram of a second network element according to an embodiment of the present invention. A second network element 1100 shown in FIG. 11 includes a processing unit 1110 and a transceiver unit 1120.

Specifically, the transceiver unit is configured to receive a first notification message that is used to indicate network function virtualization NFV resource maintenance and that is sent by a first network element, where the first notification message carries identification information of an object affected by a change of the NFV resource, the object affected by the change of the NFV resource is a virtualized network function VNF instance, a virtualized network function component VNFC instance, or a network service NS instance associated with the virtualized network function VNF instance, and the NFV resource includes at least one of the following resources: a virtual computing resource, a virtual storage resource, and a virtual network resource. The processing unit is configured to manage a service in the object affected by the change of the NFV resource.

Therefore, in this embodiment of this application, when the NFV resource is to change, the first network element reports the first notification message to the second network element, and the second network element manages the service in the object affected by the change of the NFV resource, to avoid impact made by the change of the NFV resource on the service, ensure normal running of the service, and improve user experience.

Optionally, in another embodiment, the transceiver unit is further configured to: before receiving the first notification message that is used to indicate network function virtualization NFV resource maintenance and that is sent by the first network element, send, to the first network element, a first request message used to subscribe to an NFV resource maintenance notification, where the first request message is used to request the first network element to send the first notification message when the NFV resource is to change.

Optionally, in another embodiment, the first request message carries identification information of a first object set, and the first object set includes at least one of the following objects: a virtualized network function VNF instance, a virtualized network function component VNFC instance, and a network service NS instance associated with the virtualized network function VNF instance; and the object affected by the change of the NFV resource belongs to the first object set.

Optionally, in another embodiment, the first request message further carries an additional parameter, and the additional parameter includes at least one of the following parameters: event information indicating that the NFV resource is to change, an attribute of the to-be-changed NFV resource, and a time that needs to be reserved for processing due to the change of the NFV resource. The attribute of the to-be-changed NFV resource indicates that the to-be-changed NFV resource is a virtual computing resource, a virtual storage resource, or a virtual network resource, and the event information indicating that the NFV resource is to change includes at least one piece of the following information: NFVI software upgrade, NFVI hardware repair, and NFVI hardware maintenance. The additional parameter and the identification information of the first object set are carried in a filter in the first request message, and the first notification message further includes at least one type of parameter in the additional parameter to which the second network element subscribes and that is corresponding to the to-be-changed NFV resource.

Optionally, in another embodiment, the processing unit is specifically configured to control the transceiver unit to send, to the first network element, a policy indication message used to request to modify NFVI software and/or hardware, where the policy indication message carries second constraint information used to modify NFVI software and/or hardware, and first constraint information is generated by the first network element by converting the second constraint information.

Optionally, in another embodiment, the first notification message further carries a number of the to-be-changed NFV resource, and the second constraint information includes a first change identifier of an NFV resource and at least one of the following parameters: an identifier of an NS instance, an identifier of at least one VNF instance in the NS instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in an NFVI software and/or hardware modification process, a condition for constraining migration of the VNFC, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, and a minimum quantity of virtual links VLs that need to be reserved in each of the at least one group of virtual link VL in the NFVI software and/or hardware modification process. The first change identifier of the NFV resource is corresponding to the number that is of the to-be-changed NFV resource and that is carried in the first notification message, and the object affected by the change of the NFV resource belongs to the NS instance, the at least one VNF instance in the NS instance, or the at least one group of VNFC instance in the at least one VNF instance.

Optionally, in another embodiment, the first network element is an NFV orchestrator NFVO, and the second network element is an operations support system OSS; or the first network element is a VNF manager VNFM, and the second network element is an element management system EM.

It should be understood that the second network element shown in FIG. 11 can implement the processes of the second network element in the method embodiments in FIG. 2 to FIG. 6B. Operations and/or functions of the modules in the second network element 1100 are respectively used to implement corresponding procedures in the method embodiments in FIG. 2 to FIG. 6B. For details, refer to the descriptions in the method embodiments. To avoid repetition, detailed descriptions are appropriately omitted herein.

Figure 12:
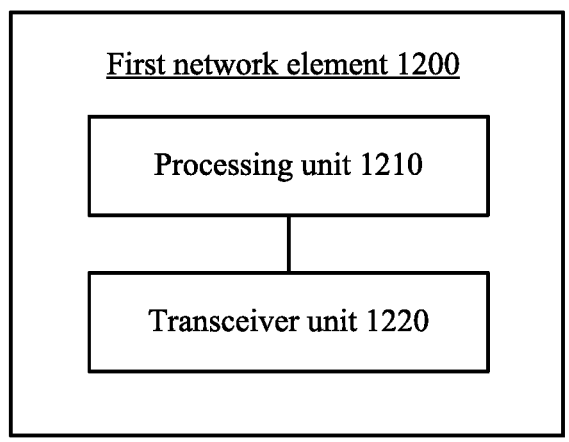
FIG. 12 is a schematic block diagram of a first network element according to another embodiment of this application.

FIG. 12 is a schematic block diagram of a first network element according to an embodiment of the present invention. A first network element 1200 shown in FIG. 12 includes a processing unit 1210 and a transceiver unit 1220.

Specifically, the processing unit is configured to: after receiving a network function virtualization NFV resource change notification sent by a virtualized infrastructure manager VIM, generate first constraint information used to modify NFVI software and/or hardware; and the transceiver unit is configured to send a first notification message to the VIM, where the first notification message carries the first constraint information, and the first constraint information is used by the VIM to modify NFVI software and/or hardware based on the first constraint information.

Therefore, in this embodiment of this application, when an NFV resource is to change, the first network element sends, to the VIM, the constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

Optionally, in another embodiment, the transceiver unit is further configured to: before sending the first notification message to the VIM, receive a subscription request message sent by the VIM, where the subscription request message is used to subscribe to constraint information used to modify NFVI software and/or hardware; and send a reply message to the VIM, where the reply message is used to indicate that the VIM successfully subscribes to the constraint information.

Optionally, in another embodiment, the first constraint information includes a change identifier of an NFV resource. The NFV resource includes at least one NFV resource group, the NFV resource group includes at least one basic NFV resource unit, and the basic NFV resource unit is a basic unit for virtual computing, a basic unit for virtual storage, or a basic unit for virtual communication. The change identifier is corresponding to a number carried in the NFV resource change notification sent by the VIM, and the NFV resource includes the to-be-changed NFV resource.

The first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

Optionally, in another embodiment, the NFV resource includes a virtual computing resource, and correspondingly the basic unit for virtual computing is a virtual computing container; or the NFV resource includes a virtual storage resource, and correspondingly the basic unit for virtual storage is a virtual storage container; or the NFV resource includes a virtual communication resource, and correspondingly the basic unit for virtual communication is a virtual link VL.

Optionally, in another embodiment, the processing unit is specifically configured to: after receiving the NFV resource change notification sent by the VIM, query for real-time running status data of a virtualized network function VNF, and generate second constraint information based on a virtualized network function descriptor VNFD; and convert the second constraint information into the first constraint information.

Optionally, in another embodiment, the second constraint information includes at least one of the following parameters: an identifier of at least one VNF instance, an identifier of at least one group of VNFC instance in the at least one VNF instance, an identifier of at least one VNFC instance in the at least one group of VNFC instance, an affinity or anti-affinity rule between the at least one group of VNFC instance, an affinity or anti-affinity rule between the VNFC instance in each of the at least one group of VNFC instance, a minimum quantity of VNFC instances that need to be reserved in each group of VNFC instance in the NFVI software and/or hardware modification process, an identifier of at least one group of virtual link VL, an identifier of at least one virtual link VL in the at least one group of virtual link VL, an affinity or anti-affinity rule between the at least one group of virtual link VL, an affinity or anti-affinity rule between the virtual link VL in the at least one group of virtual link VL, a minimum quantity of virtual links VLs that need to be reserved in each of the at least one group of virtual link VL in the NFVI software and/or hardware modification process, and a condition for constraining migration of the VNFC; and the processing unit is specifically configured to: generate the second constraint information by using a VNF life cycle that is delivered by using the VNFD; and convert the second constraint into the first constraint information based on a correspondence between a VNF instance and an NFV resource.

Optionally, in another embodiment, the first network element is an NFV orchestrator NFVO, and correspondingly the NFV resource change notification is received by the transceiver unit directly by using the VIM; or the first network element is a VNF manager VNFM, and correspondingly the NFV resource change notification is received by the transceiver unit directly by using the VIM, or the NFV resource change notification is received by the transceiver unit indirectly by using an NFVO.

It should be understood that the first network element shown in FIG. 12 can implement the processes of the first network element in the method embodiments in FIG. 7 to FIG. 9. Operations and/or functions of the modules in the first network element 1200 are respectively used to implement corresponding procedures in the method embodiments in FIG. 7 to FIG. 9. For details, refer to the descriptions in the method embodiments. To avoid repetition, detailed descriptions are appropriately omitted herein.

Figure 13:
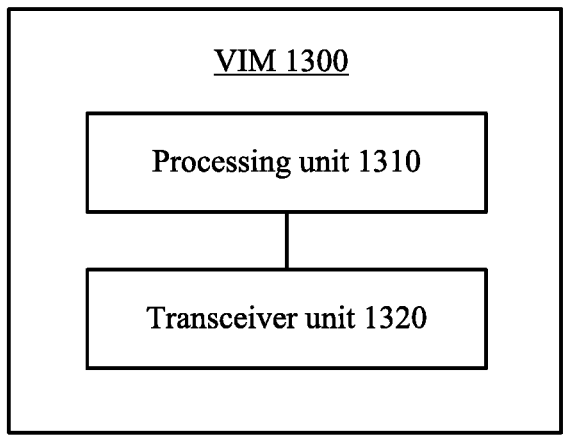
FIG. 13 is a schematic block diagram of a VIM according to an embodiment of this application.

FIG. 13 is a schematic block diagram of a VIM according to an embodiment of the present invention. A VIM 1300 shown in FIG. 13 includes a processing unit 1310 and a transceiver unit 1320.

Specifically, the transceiver unit is configured to receive a first notification message sent by a first network element, where the first notification message carries first constraint information used to modify network function virtualization infrastructure NFVI software and/or hardware. The processing unit is configured to modify NFVI software and/or hardware based on the first constraint information.

Therefore, in this embodiment of this application, when an NFV resource is to change, the first network element sends, to the VIM, the constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

Optionally, in another embodiment, the transceiver unit is further configured to: before receiving the first notification message sent by the first network element, send a first subscription request message to the first network element, where the first subscription request message is used to subscribe to constraint information used to modify NFVI software and/or hardware; and receive a reply message sent by the first network element, where the reply message is used to indicate that the VIM successfully subscribes to the constraint information.

Optionally, in another embodiment, the first constraint information includes a change identifier of an NFV resource, and the NFV resource includes at least one NFV resource group. The NFV resource group includes at least one basic NFV resource unit, and the basic NFV resource unit is a basic unit for virtual computing, a basic unit for virtual storage, or a basic unit for virtual communication. The change identifier is corresponding to a number carried in the NFV resource change notification sent by the VIM, and the NFV resource includes the to-be-changed NFV resource.

The first constraint information further includes at least one piece of the following information: an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

Optionally, in another embodiment, the NFV resource includes a virtual computing resource, and correspondingly the basic NFV resource unit is a virtual computing container; or the NFV resource includes a virtual storage resource, and correspondingly the basic NFV resource unit is a virtual storage container; or the NFV resource includes a virtual communication resource, and correspondingly the basic NFV resource unit is a virtual link VL.

Optionally, in another embodiment, the processing unit is specifically configured to: delete the NFV resource and stop deletion when a quantity of NFV resources reaches the minimum quantity of basic NFV resource units that need to be reserved, modify NFVI software and/or hardware corresponding to a deleted NFV resource; and after learning that a VNF fault management system instructs a service system to restore a service on the deleted NFV resource to a state that is before deletion, repeat the deletion process and the modification process until modification of all NFVI software and/or hardware is completed.

Optionally, in another embodiment, the first network element is an NFV orchestrator NFVO, or the first network element is a VNF manager VNFM.

It should be understood that the VIM shown in FIG. 13 can implement the processes of the VIM in the method embodiments in FIG. 7 to FIG. 9. Operations and/or functions of the modules in the VIM 1300 are respectively used to implement corresponding procedures in the method embodiments in FIG. 7 to FIG. 9. For details, refer to the descriptions in the method embodiments. To avoid repetition, detailed descriptions are appropriately omitted herein.

Figure 14:
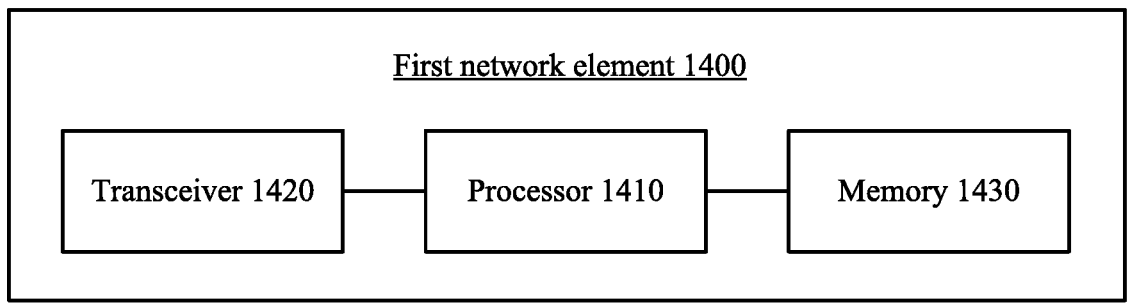
FIG. 14 is a schematic block diagram of a first network element according to another embodiment of this application.

FIG. 14 is a schematic block diagram of a first network element 1400 according to an embodiment of the present invention. Specifically, as shown in FIG. 14, the first network element 1400 includes a processor 1410 and a transceiver 1420, where the processor 1410 is connected to the transceiver 1420. Optionally, the first network element 1400 further includes a memory 1430, where the memory 1430 is connected to the processor 1410. The processor 1410, the memory 1430, and the transceiver 1420 communicate with each other by using an internal connection path, to transmit control and/or data signals. The memory 1430 may be configured to store an instruction. The processor 1410 is configured to execute the instruction stored in the memory 1430, to control the transceiver 1420 to receive and send information or signals. When executing the instruction in the memory 1430, the controller 1410 can complete the processes involving the first network element in the method embodiments in FIG. 2 to FIG. 6B. To avoid repetition, details are not described herein again.

It should be understood that the first network element 1400 may be corresponding to the first network element 1000 in FIG. 10, the function of the processing unit 1010 in the first network element 1000 may be implemented by the processor 1410, and the function of the transceiver unit 1020 may be implemented by the transceiver 1420.

Therefore, in this embodiment of this application, when an NFV resource is to change, the first network element reports a first notification message to a second network element, and the second network element manages a service in an object affected by the change of the NFV resource, to avoid impact made by the change of the NFV resource on the service, ensure normal running of the service, and improve user experience.

Figure 15:
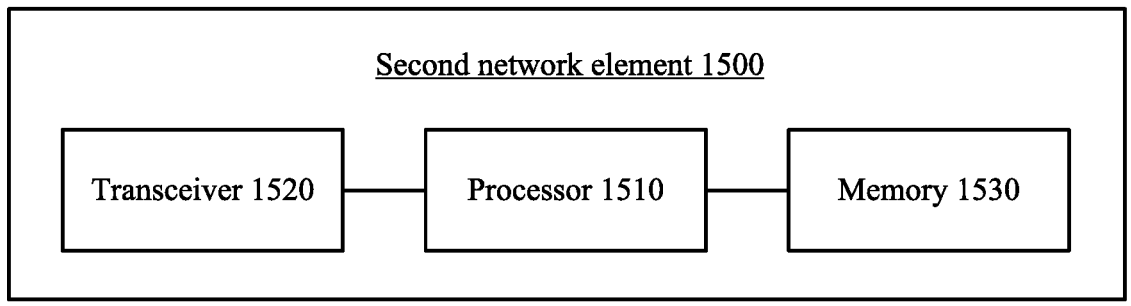
FIG. 15 is a schematic block diagram of a second network element according to another embodiment of this application.

FIG. 15 is a schematic block diagram of a second network element 1500 according to an embodiment of the present invention. Specifically, as shown in FIG. 15, the second network element 1500 includes a processor 1510 and a transceiver 1520, where the processor 1510 is connected to the transceiver 1520. Optionally, the second network element 1500 further includes a memory 1530, where the memory 1530 is connected to the processor 1510. The processor 1510, the memory 1530, and the transceiver 1520 communicate with each other by using an internal connection path, to transmit control and/or data signals. The memory 1530 may be configured to store an instruction. The processor 1510 is configured to execute the instruction stored in the memory 1530, to control the transceiver 1520 to receive and send information or signals. When executing the instruction in the memory 1530, the controller 1510 can complete the processes involving the second network element in the method embodiments in FIG. 2 to FIG. 6B. To avoid repetition, details are not described herein again.

It should be understood that the second network element 1500 may be corresponding to the second network element 1100 in FIG. 11, the function of the processing unit 1110 in the second network element 1100 may be implemented by the processor 1510, and the function of the transceiver unit 1120 may be implemented by the transceiver 1520.

Therefore, in this embodiment of this application, when an NFV resource is to change, a first network element reports a first notification message to the second network element, and the second network element manages a service in an object affected by the change of the NFV resource, to avoid impact made by the change of the NFV resource on the service, ensure normal running of the service, and improve user experience.

Figure 16:
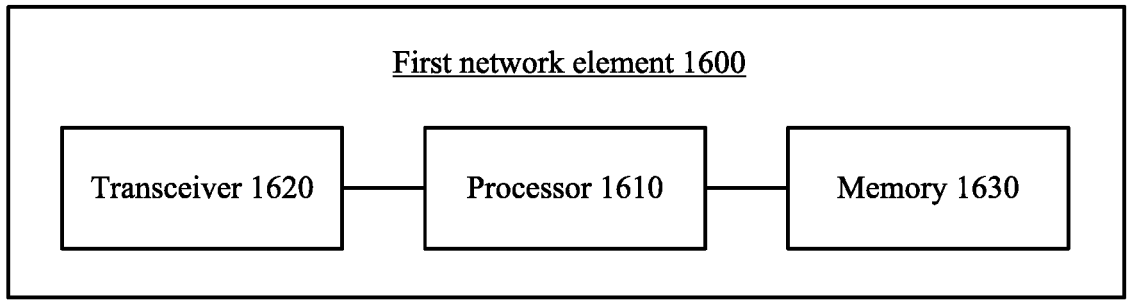
FIG. 16 is a schematic block diagram of a first network element according to another embodiment of this application.

FIG. 16 is a schematic block diagram of a first network element 1600 according to an embodiment of the present invention. Specifically, as shown in FIG. 16, the first network element 1600 includes a processor 1610 and a transceiver 1620, where the processor 1610 is connected to the transceiver 1620. Optionally, the first network element 1600 further includes a memory 1630, where the memory 1630 is connected to the processor 1610. The processor 1610, the memory 1630, and the transceiver 1620 communicate with each other by using an internal connection path, to transmit control and/or data signals. The memory 1630 may be configured to store an instruction. The processor 1610 is configured to execute the instruction stored in the memory 1630, to control the transceiver 1620 to receive and send information or signals. When executing the instruction in the memory 1630, the controller 1610 can complete the processes involving the first network element in the method embodiments in FIG. 2 to FIG. 6B. To avoid repetition, details are not described herein again.

It should be understood that the first network element 1600 may be corresponding to the first network element 1200 in FIG. 12, the function of the processing unit 1210 in the first network element 1200 may be implemented by the processor 1610, and the function of the transceiver unit 1220 may be implemented by the transceiver 1620.

Therefore, in this embodiment of this application, when an NFV resource is to change, the first network element sends, to a VIM, constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

Figure 17:
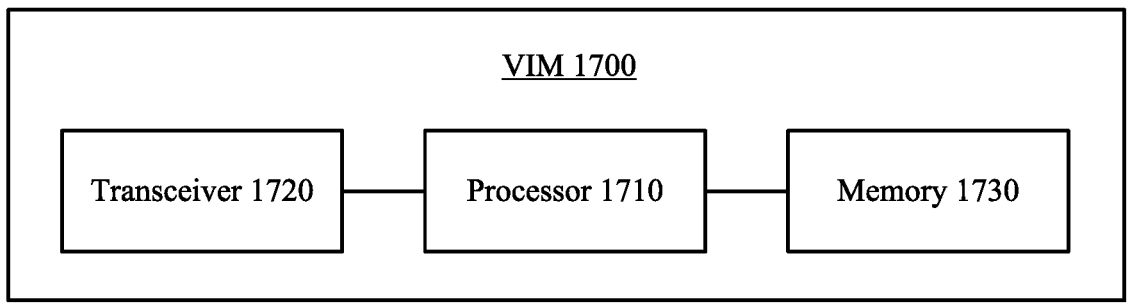
FIG. 17 is a schematic block diagram of a VIM according to another embodiment of this application.

FIG. 17 is a schematic block diagram of a VIM 1700 according to an embodiment of the present invention. Specifically, as shown in FIG. 17, the VIM 1700 includes a processor 1710 and a transceiver 1720, where the processor 1710 is connected to the transceiver 1720. Optionally, the VIM 1700 further includes a memory 1730, where the memory 1730 is connected to the processor 1710. The processor 1710, the memory 1730, and the transceiver 1720 communicate with each other by using an internal connection path, to transmit control and/or data signals. The memory 1730 may be configured to store an instruction. The processor 1710 is configured to execute the instruction stored in the memory 1730, to control the transceiver 1720 to receive and send information or signals. When executing the instruction in the memory 1730, the controller 1710 can complete the processes involving the VIM in the method embodiments in FIG. 2 to FIG. 6B. To avoid repetition, details are not described herein again.

It should be understood that the VIM 1700 may be corresponding to the VIM 1300 in FIG. 13, the function of the processing unit 1310 in the VIM 1300 may be implemented by the processor 1710, and the function of the transceiver unit 1320 may be implemented by the transceiver 1720.

Therefore, in this embodiment of this application, when an NFV resource is to change, a first network element sends, to the VIM, constraint information used to modify NFVI software and/or hardware, to avoid a problem that a service is affected because the VIM directly migrates the service. In this way, in this embodiment of this application, impact made by the change of the NFV resource on the service is avoided, a highly-reliable service is not interrupted when an NFVI changes, normal running of the service is ensured, and user experience is improved.

It should be noted that the processor (for example, the processors in FIG. 14 to FIG. 17) in the embodiments of the present invention may be an integrated circuit chip that has a signal processing capability. In an implementation process, steps in the foregoing method embodiments can be implemented by using a hardware integrated logic circuit in the processor, or by using instructions in a form of software. The processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, the steps, and the logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware in a decoding processor and a software module. A software module may be located in a mature storage medium in the art such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory (for example, the memories in FIG. 14 to FIG. 17) in the embodiments of the present invention may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. As examples rather than limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these memories and any other type of proper memory.

It should be understood that the transceiver unit or the transceiver in the embodiments of the present invention may also be referred to as a communications unit.

An embodiment of the present invention further provides a computer-readable medium. The computer-readable medium stores a computer program, and when the computer program is being executed by a computer, the computer program implements the method in any of the foregoing method embodiments.

An embodiment of the present invention further provides a computer program product. When computer program product is being executed by a computer, the computer program product implements the method in any of the foregoing method embodiments.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a high-density digital video disc (digital video disc, DVD), a semiconductor medium (for example, a solid state disk (solid state disk, SSD)), or the like.

It should be understood that the processing apparatus may be a chip. The processor may be implemented by hardware or software. When the processor is implemented by hardware, the processor may be a logic circuit, an integrated circuit, or the like. When the processor is implemented by software, the processor may be a general-purpose processor, and may be implemented by reading software code stored in the memory. The memory may be integrated into the processor, or may be located outside the processor and exist independently.

Figure 18:
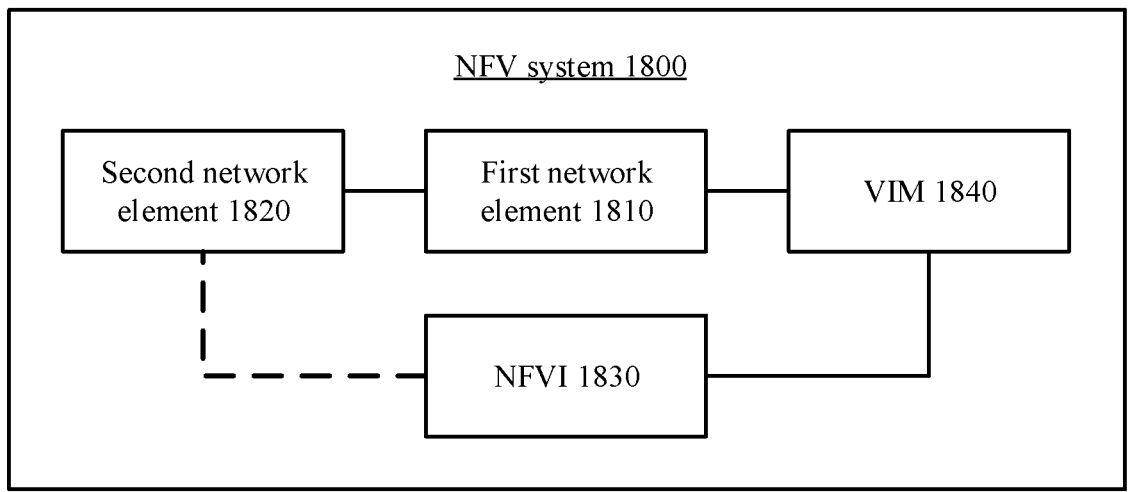
FIG. 18 is a schematic block diagram of an NFV system according to an embodiment of this application.

FIG. 18 is a schematic block diagram of a network function virtualization NFV system according to an embodiment of the present invention. An NFV system 1800 shown in FIG. 18 includes a first network element 1810, a second network element 1820, and an NFVI 1830.

Specifically, the first network element 1810 is corresponding to the first network element shown in FIG. 10, FIG. 12, FIG. 14, or FIG. 16, and the second network element 1820 is corresponding to the second network element shown in FIG. 11 or FIG. 13 or the second network element in the method embodiments in FIG. 7 to FIG. 9. When a resource of the NFVI 1830 is to change, the second network element 1820 notifies the first network element 1810, and the first network element 1810 may perform service management, to avoid service interruption.

It should be understood that the NFV system shown in FIG. 18 is similar to the system shown in FIG. 1, and may further include other function components. For example, the NFV system may further include a VIM 1840. This embodiment of this application is not limited thereto. The NFV system shown in FIG. 18 can implement the processes in the method embodiments in FIG. 2 to FIG. 9. Operations and/or functions of the modules in the NFV system 1800 are respectively used to implement corresponding procedures in the method embodiments in FIG. 2 to FIG. 9. For details, refer to the descriptions in the method embodiments. To avoid repetition, detailed descriptions are appropriately omitted herein.

It should be understood that "one embodiment" or "an embodiment" mentioned in the whole specification means that particular features, structures, or characteristics related to the embodiment are included in at least one embodiment of the present invention. Therefore, "in one embodiment" or "in an embodiment" throughout the specification does not necessarily refer to a same embodiment. In addition, these particular features, structures, or characteristics may be combined in one or more embodiments in any appropriate manner. It should be understood that in the embodiments of the present invention, sequence numbers of the foregoing processes do not mean an execution sequence. The execution sequence of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should also be understood that determining B according to A does not mean that B is determined only according to A. B may alternatively be determined according to A and/or other information.

A person of ordinary skill in the art may be aware that, with reference to the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of the present invention may be integrated into one processing unit, or each of the units may exist alone physically, or at least two units are integrated into one unit. The integrated unit may be implemented in a form of hardware, or may be implemented in a form of a software functional unit.

With descriptions of the foregoing implementations, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM, or another optical disc storage, a magnetic disk storage medium or another magnetic storage device, or any other medium that can carry or store expected program code in a form of an instruction or a data structure and that is accessible by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared, radio, and microwave, the coaxial cable, optical fiber/cable, twisted pair, DSL, or wireless technologies such as infrared, radio, and microwave are included in definition of a medium to which they belong. For example, a disk (Disk) and disc (disc) used in the present invention include a compact disc (CD), a laser disc, an optical disc, a digital versatile disc (DVD), a floppy disk, and a Blu-ray disc, where the disk generally copies data magnetically, and the disc copies data optically by using a laser. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A service management method for a network function virtualization (NFV) architecture, and the method comprising:
    generating, by a first network element, after receiving a network function virtualization (NFV) resource change notification sent by a virtualized infrastructure manager (VIM), first constraint information used to modify at least one of NFVI software and hardware, wherein after receiving the NFV resource change notification sent by the VIM, querying, by the first network element, for real-time running status data of a virtualized network function (VNF), and generating second constraint information based on a virtualized network function descriptor VNFD;
    converting, by the first network element, the second constraint information into the first constraint information; and
    sending, by the first network element, a first notification message to the VIM, wherein the first notification message carries the first constraint information, and the first constraint information is used by the VIM to modify at least one of NFVI software and hardware.

2. The method according to claim 1, wherein before the sending, by the first network element, a first notification message to the VIM, the method further comprises:
    receiving, by the first network element, a subscription request message sent by the VIM, wherein the subscription request message is used to subscribe to constraint information used to modify at least one of NFVI software and hardware; and
    sending, by the first network element, a reply message to the VIM, wherein the reply message is used to indicate that the VIM successfully subscribes to the constraint information.

3. The method according to claim 1, wherein
    the first constraint information comprises a change identifier of an NFV resource;
    the NFV resource comprises at least one NFV resource group, the NFV resource group comprises at least one basic NFV resource unit, the basic NFV resource unit is at least one of a basic unit for virtual computing, a basic unit for virtual storage, or a basic unit for virtual communication, the change identifier of the NFV resource corresponds to a number that is of a to-be-changed NFV resource and that is carried in the NFV resource change notification sent by the VIM, and the NFV resource comprises the to-be-changed NFV resource; and
    the first constraint information further comprises at least one piece of the following information:
    an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in at least one of an NFVI software and hardware modification process, or a condition for constraining migration of a basic NFV resource unit.

4. The method according to claim 3, wherein the NFV resource comprises one of:
a virtual computing resource, and the basic NFV resource unit is a virtual computing container;
a virtual storage resource, and the basic NFV resource unit is a virtual storage volume; and
a virtual communication resource, and the basic NFV resource unit is a virtual link VL.

5. The method according to claim 1, wherein the second constraint information comprises at least one of the following parameters:
an identifier of at least one VNF instance, an identifier of at least one group of VNFC instance in the at least one VNF instance, an identifier of at least one VNFC instance in the at least one group of VNFC instance, an affinity or anti-affinity rule between the at least one group of
VNFC instance, an affinity or anti-affinity rule between the VNFC instance in each of the at least one group of VNFC instance, a minimum quantity of VNFC instances that need to be reserved in each group of VNFC instance in an NFV resource software and/or hardware modification process, an identifier of at least one group of virtual link (VL), an identifier of at least one virtual link (VL) in the at least one group of virtual link (VL), an affinity or anti-affinity rule between the at least one group of virtual link (VL), an affinity or anti-affinity rule between the virtual link (VL) in the at least one group of virtual link (VL), a minimum quantity of virtual links (VLs) that need to be reserved in each of the at least one group of virtual link (VL) in the NFV resource software and/or hardware modification process, and a condition for constraining migration of a VNFC instance;
the generating second constraint information based on a virtualized network function descriptor (VNFD) comprises:
generating, by the first network element, the second constraint information by using a VNF life cycle management script carried in the VNFD; and
the converting, by the first network element, the second constraint information into the first constraint information comprises:
converting, by the first network element, the second constraint information into the first constraint information based on a correspondence between a VNF instance and an NFV resource.

6. The method according to claim 1, wherein the first network element is one of
an NFV orchestrator (NFVO), and the NFV resource change notification is received by the NFVO directly by using the VIM; and
a VNF manager (VNFM), and the NFV resource change notification is received by the VNFM directly by using the VIM, or the NFV resource change notification is received by the VNFM indirectly by using an NFVO.

7. A first network element in a network function virtualization (NFV) architecture, comprising:
a processing unit, configured to, after receiving a network function virtualization (NFV) resource change notification sent by a virtualized infrastructure manager (VIM), generate first constraint information used to modify at least one of NFVI software and hardware, wherein after receiving the NFV resource change notification sent by the VIM, query, by the first network element, for real-time running status data of a virtualized network function (VNF), and generating second constraint information based on a virtualized network function descriptor VNFD; and
convert, by the first network element, the second constraint information into the first constraint information; and
a transceiver unit, configured to, in coordination with the processing unit, send a first notification message to the VIM, wherein the first notification message carries the first constraint information, and the first constraint information is used by the VIM to modify at least one of NFVI software and hardware based on the first constraint information.

8. The first network element according to claim 7, wherein the transceiver unit is further configured to: before sending the first notification message to the VIM, receive a subscription request message sent by the VIM, wherein the subscription request message is used to subscribe to constraint information used to modify at least one of NFVI software and hardware; and
send a reply message to the VIM, wherein the reply message is used to indicate that the VIM successfully subscribes to the constraint information.

9. The first network element according to claim 7, wherein the first constraint information comprises a change identifier of an NFV resource;
the NFV resource comprises at least one NFV resource group, the NFV resource group comprises at least one basic NFV resource unit, the basic NFV resource unit is a basic unit for virtual computing, a basic unit for virtual storage, or a basic unit for virtual communication, the change identifier is corresponding to a number carried in the NFV resource change notification sent by the VIM, and the NFV resource comprises a to-be-changed NFV resource; and
the first constraint information further comprises at least one piece of the following information:
an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

10. The first network element according to claim 9, wherein
the NFV resource comprises one of:
a virtual computing resource, and correspondingly the basic unit for virtual computing is a virtual computing container;
a virtual storage resource, and correspondingly the basic unit for virtual storage is a virtual storage container; and
a virtual communication resource, and correspondingly the basic unit for virtual communication is a virtual link (VL).

11. The first network element according to claim 7, wherein
the second constraint information comprises at least one of the following parameters:

an identifier of at least one VNF instance, an identifier of at least one group of VNFC instance in the at least one VNF instance, an identifier of at least one VNFC instance in the at least one group of VNFC instance, an affinity or anti-affinity rule between the at least one group of
VNFC instance, an affinity or anti-affinity rule between the VNFC instance in each of the at least one group of VNFC instance, a minimum quantity of VNFC instances that need to be reserved in each group of VNFC instance in the NFVI software and/or hardware modification process, an identifier of at least one group of virtual link (VL), an identifier of at least one virtual link (VL) in the at least one group of virtual link (VL), an affinity or anti-affinity rule between the at least one group of virtual link (VL), an affinity or anti-affinity rule between the virtual link (VL) in the at least one group of virtual link (VL), a minimum quantity of virtual links (VLs) that need to be reserved in each of the at least one group of virtual link (VL) in the
NFVI software and/or hardware modification process, and a condition for constraining migration of a VNFC instance; and
the processing unit is further configured to: generate the second constraint information by using a VNF life cycle management script carried in the VNFD; and
convert the second constraint information into the first constraint information based on a correspondence between a VNF instance and an NFV resource.

12. The first network element according to claim 7, wherein
the first network element is one of
an NFV orchestrator NFVO, and correspondingly the NFV resource change notification is received by the transceiver unit directly by using the VIM; and
a VNF manager (VNFM), and correspondingly the NFV resource change notification is received by the transceiver unit directly by using the VIM, or the NFV resource change notification is received by the transceiver unit indirectly by using an NFVO.

13. A service management method, wherein the method is applied to a network function virtualization (NFV) architecture, and the method comprises:
determining, by a first network element, an object affected by a change of a network function virtualization (NFV) resource, wherein the object affected by the change of the NFV resource is a virtualized network function (VNF) instance, a virtualized network function component (VNFC) instance, or a network service NS instance associated with the virtualized network function (VNF) instance, and the NFV resource comprises at least one of the following resources: a virtual computing resource, a virtual storage resource, and a virtual network resource, wherein after determining object affected by a change to the NFV resource, querying, by the first network element, for real-time running status data of a virtualized network function (VNF), and generating second constraint information based on a virtualized network function descriptor VNFD;
converting, by the first network element, the second constraint information into the first constraint information; and
sending, by the first network element to a second network element, a first notification message used to indicate NFV resource maintenance, wherein the first notification message carries identification information of the object affected by the change of the NFV resource, so that the second network element manages a service in the object affected by the change of the NFV resource.

14. The method according to claim 13, wherein before the sending, by the first network element to a second network element, a first notification message used to indicate NFV resource maintenance, the method further comprises:
receiving, by the first network element, a first request message that is used to subscribe to an NFV resource maintenance notification and that is sent by the second network element, wherein the first request message is used to request the first network element to send the first notification message when the NFV resource is to change.

15. The method according to claim 14, wherein
the first request message carries identification information of a first object set, and the first object set comprises at least one of the following objects: a virtualized network function (VNF) instance, a virtualized network function component (VNFC) instance, and a network service NS instance associated with the virtualized network function (VNF) instance; and
the sending, by the first network element to a second network element, a first notification message used to indicate NFV resource maintenance comprises:
when the first network element determines that the object affected by the change of the NFV resource belongs to the first object set, sending, by the first network element to the second network element, the first notification message used to indicate NFV resource maintenance.

16. The method according to claim 14, wherein the first request message further carries an additional parameter, and the additional parameter comprises at least one of the following parameters:
event information indicating that the NFV resource is to change, an attribute of the to-be-changed NFV resource, and a time that needs to be reserved for processing due to the change of the NFV resource;
the attribute of the to-be-changed NFV resource indicates that the to-be-changed NFV resource is a virtual computing resource, a virtual storage resource, or a virtual network resource, and the event information indicating that the NFV resource is to change comprises at least one piece of the following information: NFVI software upgrade, NFVI hardware repair, and NFVI hardware maintenance;
the additional parameter and the identification information of the first object set are carried in a filter in the first request message; and
the first notification message further comprises at least one type of parameter in the additional parameter to which the second network element subscribes and that is corresponding to the to-be-changed NFV resource.

17. The method according to claim 13, wherein after the sending, by the first network element to a second network element, a first notification message used to indicate NFV resource maintenance, the method further comprises:
sending, by the first network element to a virtualized infrastructure manager VIM, a second request message used to request to modify NFVI software and/or hardware, wherein the second request message carries first constraint information used to modify NFVI software and/or hardware.

18. The method according to claim 17, wherein the first notification message further carries a number of the to-be-changed NFV resource;
the first constraint information comprises a second change identifier of an NFV resource;

the NFV resource comprises at least one NFV resource group, the NFV resource group comprises at least one basic NFV resource unit, the basic NFV resource unit is a basic unit for virtual computing, a basic unit for virtual storage, or a basic unit for virtual communication, the second change identifier of the NFV resource is corresponding to the number that is of the to-be-changed NFV resource and that is carried in the first notification message, and the NFV resource comprises the to-be-changed NFV resource; and the first constraint information further comprises at least one piece of the following information:

an identifier of the NFV resource, an identifier of the at least one NFV resource group in the NFV resource, an identifier of the at least one basic NFV resource unit in the NFV resource group, an affinity or anti-affinity rule between the at least one NFV resource group, an affinity or anti-affinity rule between the basic NFV resource unit in each of the at least one NFV resource group, a minimum quantity of basic NFV resource units that need to be reserved in each NFV resource group in an NFVI software and/or hardware modification process, and a condition for constraining migration of a basic NFV resource unit.

* * * * *

UNITED STATES PATENT AND TRADEMARK OFFICE
CERTIFICATE OF CORRECTION

PATENT NO. : 11,310,123 B2
APPLICATION NO. : 16/865092
DATED : April 19, 2022
INVENTOR(S) : Ni et al.

It is certified that error appears in the above-identified patent and that said Letters Patent is hereby corrected as shown below:

On the Title Page

Page 2: item (56) Other Publications, Column 2, Line 24: "TS 28 525 V0.6.0, pp. 1-30, 3rd Generation Partnership Project," should read -- TS 28.525 V0.6.0, pp. 1-30, 3rd Generation Partnership Project, --.

In the Claims

Claim 5: Column 57, Line 21: "VNEC instance, an affinity or anti-affinity rule between" should read -- VNFC instance, an affinity or anti-affinity rule between --.

Signed and Sealed this
Sixteenth Day of August, 2022

Katherine Kelly Vidal
*Director of the United States Patent and Trademark Office*